(12) United States Patent
Ueda

(10) Patent No.: US 8,318,342 B2
(45) Date of Patent: Nov. 27, 2012

(54) ALL SOLID-STATE POLYMER BATTERY

(75) Inventor: Tomohiro Ueda, Nara (JP)

(73) Assignee: Panasonic Corporation, Osaka (JP)

( * ) Notice: Subject to any disclaimer, the term of this patent is extended or adjusted under 35 U.S.C. 154(b) by 438 days.

(21) Appl. No.: 12/516,525

(22) PCT Filed: Jun. 18, 2008

(86) PCT No.: PCT/JP2008/001573
§ 371 (c)(1),
(2), (4) Date: May 27, 2009

(87) PCT Pub. No.: WO2009/001526
PCT Pub. Date: Dec. 31, 2008

(65) Prior Publication Data
US 2010/0068628 A1    Mar. 18, 2010

(30) Foreign Application Priority Data

Jun. 22, 2007 (JP) .................. 2007-164999
Oct. 23, 2007 (JP) .................. 2007-275418
Nov. 16, 2007 (JP) .................. 2007-298260

(51) Int. Cl.
*H01M 6/14* (2006.01)
(52) U.S. Cl. ............................................. 429/188
(58) Field of Classification Search .................. None
See application file for complete search history.

(56) References Cited

U.S. PATENT DOCUMENTS

| | | | |
|---|---|---|---|
| 6,902,848 B1 * | 6/2005 | Izuchi et al. | 429/300 |
| 2006/0003226 A1 * | 1/2006 | Sawa et al. | 429/218.1 |
| 2006/0199939 A1 * | 9/2006 | Nishio et al. | 528/125 |
| 2007/0259271 A1 * | 11/2007 | Nanno et al. | 429/318 |

FOREIGN PATENT DOCUMENTS

| | | |
|---|---|---|
| JP | 63-143747 | 6/1988 |
| JP | 63-146355 | 6/1988 |

(Continued)

OTHER PUBLICATIONS

Kiyoshi Kanamura, "Advanced Technologies for Polymer Battery II" pp. 113, lines 5-13 with Partial English Translation.

(Continued)

*Primary Examiner* — Patrick Joseph Ryan
*Assistant Examiner* — Wyatt McConnell
(74) *Attorney, Agent, or Firm* — McDermott Will & Emery LLP

(57) ABSTRACT

An all solid-state polymer battery uses: 1) a lithium based negative electrode active material including crystal grains and crystal grain boundaries, wherein at least part of the crystal grain boundaries are exposed on a surface of the lithium-based negative electrode active material, and the area of the exposed surface of the crystal grain boundaries is 0.02 to 0.5 cm$^2$ per square centimeter of surface; 2) a dry polymer electrolyte including a specific ethylene glycol ether, a polymer containing electron-donating oxygen atoms in the skeleton, and a lithium salt; or 3) an amorphous lithium nitride layer formed between the negative electrode and the polymer electrolyte. This reduces the resistance at the interface between the negative electrode and the polymer electrolyte, thereby providing an all solid-state polymer battery with high capacity and excellent cycle characteristics. This also suppresses an increase in internal resistance during storage, thereby providing an all solid-state polymer battery with excellent high-rate discharge characteristics after storage.

12 Claims, 8 Drawing Sheets

FOREIGN PATENT DOCUMENTS

| | | |
|---|---|---|
| JP | 63-298980 | 12/1988 |
| JP | 02-207460 | 8/1990 |
| JP | 07-029413 | 1/1995 |
| JP | 08-130006 | 5/1996 |
| JP | 09-219218 | 8/1997 |
| JP | 10-144349 | 5/1998 |
| JP | 10-302770 | 11/1998 |
| JP | 2007-005279 | 1/2007 |

OTHER PUBLICATIONS

Tetsuichi Kudo et al., "Solid Ionics," p. 76, Fig. 6.10 Crystal Structure of $Li_3N$ with Partial English Translation.

* cited by examiner

ALL SOLID-STATE POLYMER BATTERY

RELATED APPLICATIONS

This application is the U.S. National Phase under 35 U.S.C. §371 of International Application No. PCT/JP2008/001573, filed on Jun. 18, 2008, which in turn claims the benefit of Japanese Application Nos. 2007-164999, filed on Jun. 22, 2007, 2007-275418, filed on Oct. 23, 2007 and 2007-298260, filed on Nov. 16, 2007, the disclosures of which Applications are incorporated by reference herein.

TECHNICAL FIELD

The invention relates to all solid-state polymer batteries. More particularly, the invention mainly relates to an improvement in the negative electrode active material for all solid-state polymer batteries, an improvement in the dry polymer electrolyte therefor, and an improvement in the structure of the electrode assembly therefor.

BACKGROUND ART

Non-aqueous electrolyte batteries are roughly classified into liquid electrolyte type batteries and solid type batteries. Liquid electrolyte type batteries are batteries including a liquid electrolyte between the positive electrode and the negative electrode. While liquid electrolyte type batteries have high battery capacity, they need a precise structure to prevent a "leak", which is an outward leakage of the liquid electrolyte from the battery. Solid type batteries are batteries including a solid electrolyte between the positive electrode and the negative electrode. Since solid type batteries are free from the fear of a leak, they have high battery safety and reliability. They also have advantages in that battery thickness can be reduced and battery lamination is possible.

In solid type batteries, various inorganic and organic materials are used as the solid electrolyte. Among them, solid electrolytes comprising inorganic materials have high ionic conductivity, but have high brittleness, which makes it difficult to form a flexible film. As solid electrolytes comprising organic materials, for example, polymer electrolytes comprising organic polymer compounds are known.

Polymer electrolytes, which are highly flexible and permit relatively easy formation of a thin film, compared to solid electrolytes comprising inorganic materials, are examined toward practical utilization. Among them, dry polymer electrolytes, which contain no non-aqueous solvent and thus have very high safety in addition to the aforementioned characteristics of polymer electrolytes, are expected to be put into practical utilization. Solid type batteries including a dry polymer electrolyte are commonly termed all solid-state polymer batteries.

A known example of dry polymer electrolytes is a composite of polyethylene oxide and an alkali metal salt such as a lithium salt or sodium salt. This dry polymer electrolyte, however, has a low ionic conductivity at room temperature of $10^{-4}$ to $10^{-7}$ S/cm. Hence, all solid-state polymer batteries including this dry polymer electrolyte are low in battery capacity, in particular, battery capacity under a high load.

In view of the above-stated problem with dry polymer electrolytes, examinations have been made as to various constituent components of all solid-state polymer batteries, such as the dry polymer electrolyte, active material, and electrode assembly structure. A proposal to improve the ionic conductivity of a dry polymer electrolyte is, for example, to make polyethylene oxide amorphous (for example, see Non-Patent Document 1). Specifically, making it amorphous means making the regular molecular arrangement in the crystal random, by linking the side chains of polyethylene oxide with short ethylene oxide chains.

However, the ionic conductivity of amorphous polyethylene oxide is only approximately $10^{-4}$ S/cm at room temperature, which is an insufficient improvement in ionic conductivity. Thus, the use of amorphous polyethylene oxide cannot solve the problem of the low battery capacity of all solid-state polymer batteries. In particular, after storage, internal resistance increases and battery capacity lowers significantly.

Also, there has been proposed a polymer electrolyte which is prepared by impregnating a polymer including polyvinylidene fluoride as the matrix with a solution that is prepared by dissolving a lithium salt in an ether such as diethoxyethane or dimethoxyethane (for example, see Patent Document 1). Patent Document 1 intends to improve the electrical conductivity, i.e., ionic conductivity of a polymer electrolyte by impregnating a polymer with an ether solution of a lithium salt.

There has also been proposed a polymer electrolyte which is prepared by hydrosilylation of a copolymer of vinyl ether and allyl vinyl ether and subsequent cross-linking in a liquid plasticizer in the presence of a diprotic cross-linking agent (for example, see Patent Document 2). The liquid plasticizer is dimethoxyethane, an oligo ethylene glycol dialkyl ether, or a polyethylene glycol dialkyl ether. The technique of Patent Document 2 intends to improve the ionic conductivity of a polymer electrolyte by providing a polymer electrolyte comprising a cross-linked polymer impregnated with a liquid plasticizer.

The polymer electrolytes of Patent Documents 1 and 2 have higher ionic conductivities than a dry polymer electrolyte comprising a composite of polyethylene oxide and an alkali metal salt. However, these improvements in ionic conductivity are not on the satisfactory level.

Dry polymer electrolytes have low ionic conductivities, as described above. Also, dry polymer electrolytes have poor flowability. Therefore, in all solid-state polymer batteries, the contact area of an active material layer and the electrolyte at the electrode interface becomes small. In particular, when lithium or a lithium alloy (hereinafter referred to as a "lithium-based active material") is used as a negative electrode active material, the volume of the negative electrode active material layer changes significantly during charge/discharge. Further, the dry polymer electrolyte is subject to decomposition, and an insulating coating film is likely to be formed at the interface between the negative electrode active material layer and the electrolyte. It is therefore very difficult to prevent the contact area of the negative electrode active material layer and the electrolyte from becoming small. As a result, the internal resistance of the battery increases. As used herein, "electrode interface" refers to the interface between an active material layer and an electrolyte.

Due to such characteristics of dry polymer electrolytes, the diffusion of lithium ions at the electrode interface determines the rate of the charge/discharge reaction of all solid-state polymer batteries. Hence, in all solid-state polymer primary batteries, shortage of lithium ions capable of contributing to the electrode reaction at the electrode interface makes the electrode reaction difficult. As a result, polarization during charge/discharge increases, and discharge capacity under a high load decreases sharply. Also, in all solid-state polymer secondary batteries, repeated charge/discharge further decreases the contact area of the active material layer and the electrolyte, thereby lowering battery capacity, which eventually results in deterioration in charge/discharge cycle characteristics.

In order to obtain a highly reliable battery that is free from an internal short-circuit, it has been proposed to provide a thin layer (thickness 5 to 10 μm) of crystalline lithium nitride ($Li_3N$) on the face of a lithium negative electrode facing a dry polymer electrolyte (for example, see Patent Document 3). Also, crystalline lithium nitride with relatively high ionic conductivity has been proposed (see Non-Patent Document 2). The ionic conductivity of the crystalline lithium nitride of Non-Patent Document 2 is $1.2\times10^{-3}$ S/cm for single crystal in the direction perpendicular to c axis and $1\times10^{-5}$ S/cm for monocrystal in the direction parallel to c axis. Also, it is $7\times10^{-4}$ S/cm for polycrystal. However, even when the crystalline lithium nitride of Non-Patent Document 2 is used in the technique of Patent Document 3, it is difficult to suppress an increase in the internal resistance of the all solid-state polymer battery after storage.

Also, in order to enhance the coulombic efficiency of liquid electrolyte type non-aqueous electrolyte secondary batteries, it has been proposed to use a negative electrode including an alkali metal crystal with an average crystal grain size of 20 μm or more (for example, see Patent Document 4). When this negative electrode is used, the alkali metal deposits in the shape of spheres or thick lines on the surface of the alkali metal crystal during charge. Since most of the deposited alkali metal dissolves during discharge, coulombic efficiency improves. Likewise, the use of a negative electrode including an alkali metal crystal with an average crystal grain size of 1 μm or more can also improve the coulombic efficiency of the non-aqueous electrolyte secondary battery (for example, see Patent Document 5).

Although the negative electrodes of Patent Documents 4 and 5 are effective for liquid electrolyte type batteries, they increase the internal resistance before and after charge/discharge when used in all solid-state polymer batteries. It is thus not possible to sufficiently prevent battery capacity from lowering. Also, when an all solid-state polymer battery including the negative electrode of Patent Document 4 or 5 is produced as a secondary battery, the cycle characteristics become insufficient.

Non-Patent Document 1: Advanced Technologies for Polymer Battery II, edited by Kiyoshi Kanamura, p 113, CMC Publishing Co., Ltd
Non-Patent Document 2: Solid Ionics, coauthored by Tetsuichi Kudo and Kazuo Fueki, p 76, Kodansha
Patent Document 1: Japanese Laid-Open Patent Publication No. Hei 9-219218
Patent Document 2: Japanese Laid-Open Patent Publication No. Hei 7-029413
Patent Document 3: Japanese Laid-Open Patent Publication No. Sho 63-298980
Patent Document 4: Japanese Laid-Open Patent Publication No. Sho 63-143747
Patent Document 5: Japanese Laid-Open Patent Publication No. Sho 63-146355

DISCLOSURE OF THE INVENTION

Problem to be Solved by the Invention

An object of the invention is to provide an all solid-state polymer battery which does not suffer from increased internal resistance, has high battery capacity, and is excellent in cycle characteristics and high-rate discharge characteristics.

Means for Solving the Problem

In order to solve the above-discussed problems, the present inventor has diligently conducted research. In the process of the research, he has noted the contact area of a negative electrode active material and an electrolyte (hereinafter referred to as simply "contact area") at the interface between the negative electrode and the electrolyte (hereinafter referred to as "negative electrode interface").

In a negative electrode including a lithium-based active material, such as lithium or a lithium alloy, the volume of the lithium-based active material changes significantly due to charge/discharge reaction. If the electrolyte is a liquid electrolyte as in a liquid electrolyte type battery, the contact area at the negative electrode interface can be easily held large even if the volume of the lithium-based active material changes. Thus, the use of the negative electrodes of Patent Documents 4 and 5 in liquid electrolyte type batteries can produce the effect of improving coulombic efficiency.

In contrast, the polymer electrolyte used in an all solid-state polymer battery is solid, and has poor flowability compared to liquid electrolytes and gelled polymer electrolytes. Hence, if the volume of a lithium-based active material changes, it is difficult to maintain the contact area at the negative electrode interface almost constant, and the contact area decreases. Also, at the negative electrode interface, an insulating coating film comprising a decomposition product of the dry polymer electrolyte is likely to be formed, and hence, the contact area decreases further. As a result, the resistance at the negative electrode interface (hereinafter referred to as "interfacial resistance") increases, so that the battery capacity lowers. In the case of secondary batteries, the cycle characteristics deteriorate.

Based on the above findings, the present inventor has conducted further research and succeeded in producing a lithium-based active material capable of reducing the interfacial resistance even when the contact area at the negative electrode interface is small. Also, the present inventor has succeeded in producing a dry polymer electrolyte having good ionic conductivity and capable of preventing an increase in the interfacial resistance at the negative electrode interface. Further, the present inventor has succeeded in obtaining the structure of an electrode assembly for an all solid-state polymer battery capable of suppressing an increase in internal resistance during storage.

That is, the invention is directed to an all solid-state polymer battery including a positive electrode, a negative electrode including a negative electrode active material, and a dry polymer electrolyte.

Preferably, the negative electrode active material is lithium or a lithium alloy including crystal grains and crystal grain boundaries, at least part of the crystal grain boundaries are exposed on a surface of the lithium or lithium alloy, and the area of the exposed surface of the crystal grain boundaries is 0.02 to 0.5 $cm^2$ per square centimeter of the surface of the lithium or lithium alloy.

More preferably, the crystal grain boundaries of the negative electrode active material include lithium oxide, and the lithium oxide is present in the exposed surface of the crystal grain boundaries.

More preferably, the crystal grain boundaries of the negative electrode active material include lithium oxide, and the lithium oxide is present in the region extending 100 to 1000 nm from the exposed surface of the crystal grain boundaries in the direction perpendicular to the exposed surface.

More preferably, the crystal grains of the negative electrode active material have a grain size of 100 to 1000 nm.

Preferably, the dry polymer electrolyte includes: (1) at least one ethylene glycol ether selected from the group consisting of methyl monoglyme, methyl diglyme, methyl triglyme, methyl tetraglyme, methyl pentaglyme, ethyl monoglyme, ethyl diglyme, ethyl triglyme, ethyl tetraglyme, and ethoxymethoxyethane; (2) a polymer containing electron-donating oxygen atoms in a skeleton; and (3) a lithium salt.

More preferably, when the dry polymer electrolyte is vacuum dried at 20° C. for 24 hours, the mass of the dry polymer electrolyte decreases at a rate of 3% or less.

More preferably, the lithium salt is dissociated to a lithium ion and an anion, the molar ratio of the lithium ion to the electron-donating oxygen atoms is from 0.01 to 0.125, and the molar ratio of the lithium ion to the ethylene glycol ether is from 0.05 to 3.

More preferably, the polymer containing the electron-donating oxygen atoms in the skeleton is at least one selected from the group consisting of polyethylene oxide, polypropylene oxide, a copolymer of ethylene oxide and propylene oxide, a polymer containing an ethylene oxide unit or a propylene oxide unit, and polycarbonate.

More preferably, the lithium salt is at least one selected from the group consisting of $LiN(CF_3SO_2)_2$, $LiN(C_2F_5SO_2)_2$, and $LiClO_4$.

More preferably, the ethylene glycol ether is a fluorine-containing ethylene glycol ether which contains at least one fluorine atom.

Preferably, the negative electrode contains lithium, and an amorphous lithium nitride layer is provided between the negative electrode and the dry polymer electrolyte.

More preferably, a 1 s spectrum of N in a surface of the lithium nitride layer by XPS analysis has a maximum peak only from 393.5 to 394.5 eV in the binding energy range of 390.0 to 396.0 eV.

Effect of the Invention

In the all solid-state polymer battery of the invention, the negative electrode active material of the invention is a lithium-based active material capable of suppressing an increase in interfacial resistance and reducing interfacial resistance even when the contact area at the negative electrode interface is small. Therefore, the negative electrode active material of the invention can be advantageously used in various batteries, and is particularly effective as the negative electrode active material for an all solid-state polymer battery.

Even when the all solid-state polymer battery including the negative electrode active material of the invention uses a conventional polymer electrolyte as the electrolyte, it has a low resistance at the negative electrode interface and high battery capacity. Even under a high load, it can retain high battery capacity. Also, when the all solid-state polymer battery including the negative electrode active material of the invention is produced as a secondary battery, the resultant secondary battery has high battery capacity and excellent cycle characteristics.

In the all solid-state polymer battery of the invention, the dry polymer electrolyte of the invention has good ionic conductivity, and can prevent an increase in interfacial resistance at the electrode interface, in particular, at the negative electrode interface. Therefore, the use of the dry polymer electrolyte of the invention can provide an all solid-state polymer battery with high battery capacity.

The all solid-state polymer battery of the invention has high battery capacity due to the inclusion of the dry polymer electrolyte of the invention. Also, even when a lithium-based active material is included therein as the negative electrode active material, an increase in interfacial resistance at the negative electrode interface is highly unlikely to occur, and the interfacial resistance at the negative electrode interface is maintained almost constant. The battery capacity is thus unlikely to lower.

Hence, when the all solid-state polymer battery of the invention including the dry polymer electrolyte of the invention is used as a primary battery, the discharge capacity does not lower even under a high load, and excellent output characteristics are exhibited. When it is used as a secondary battery, there is almost no loss of battery capacity due to repeated charge/discharge, excellent charge/discharge cycle characteristics are exhibited, and charge/discharge cycle characteristics are retained at a high level over an extended period of time.

In the all solid-state polymer battery of the invention, the provision of an amorphous lithium nitride layer between the negative electrode and the dry polymer electrolyte can suppress an increase in internal resistance during storage even when the negative electrode includes lithium. As a result, it is possible to obtain an all solid-state polymer battery having excellent high-rate discharge characteristics after storage.

BEST MODE FOR CARRYING OUT THE INVENTION

The all solid-state polymer battery of the invention includes one or more embodiments selected from the following first to third embodiments of the invention.
[Negative Electrode Active Material]

A first embodiment of the invention is the negative electrode active material.

Figure 1:
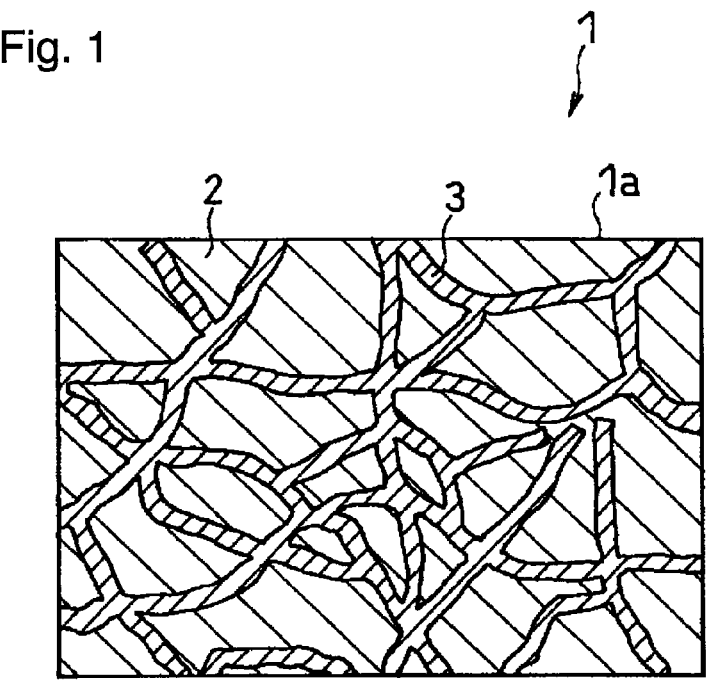
FIG. 1 is a longitudinal sectional view schematically showing an example of the crystal structure of a negative electrode active material, which is a first embodiment of the invention.

The negative electrode active material of the invention is lithium or a lithium alloy including crystal grains and crystal grain boundaries in the crystal structure, and at least part of the crystal grain boundaries are exposed on the surface. FIG. 1 is a longitudinal sectional view schematically showing an example of the crystal structure of a negative electrode active material 1, which is one embodiment of the invention.

The negative electrode active material 1 is lithium (lithium simple substance) or a lithium alloy. The lithium alloy can be one commonly used as an electrode active material in the battery field, and examples include a Li—Si alloy, a Li—Sn alloy, a Li—Al alloy, a Li—Ga alloy, a Li—Mg alloy, and a Li—In alloy.

Also, the negative electrode active material 1 includes crystal grains 2 and crystal grain boundaries 3 in the crystal structure. The crystal grain boundaries 3 are present, for example, between adjacent crystal grains 2, and at least part of the crystal grain boundaries 3 are exposed on a surface 1a of the negative electrode active material 1.

On the surface 1a of the negative electrode active material 1, the area of the exposed surface of the crystal grain boundaries 3 is 0.02 to 0.5 $cm^2$ per square centimeter of the surface 1a. Since the crystal grain boundaries 3 have higher ionic conductivity than the crystal grains 2, they serve as ion conducting paths at the negative electrode interface during charge/discharge. Thus, the exposure of the crystal grain boundaries 3 on the surface 1a of the negative electrode active material 1 at the aforementioned ratio ensures ionic conductivity even when the contact area at the negative electrode interface is small, thereby permitting a reduction in the interfacial resistance at the negative electrode interface.

If the exposed area is less than 0.02 $cm^2$, the effect of reducing the interfacial resistance at the negative electrode interface may become insufficient. On the other hand, if the exposed area exceeds 0.5 $cm^2$, the active material capacity may become low. That is, since the crystal grain boundaries 3 are not sites that directly contribute to charge/discharge reaction, an increase in the exposed area of the crystal grain boundaries 3 results in a corresponding decrease in the sites contributing to charge/discharge reaction, so that the active material capacity may lower.

In the negative electrode active material 1, the crystal grain boundaries 3 preferably contain lithium oxide. Lithium oxide, which has a particularly high ionic conductivity, serves as a good ion conducting path at the negative electrode interface. Since the crystal grain boundaries 3 are active sites, they easily react with oxygen in the air to form lithium oxide.

It should be noted, however, that the crystal grain boundaries 3 may react with moisture or carbon dioxide in the air to form lithium hydroxide or lithium carbonate, which has a lower ionic conductivity than lithium oxide. Since lithium hydroxide and lithium carbonate serve as insulating layers during charge/discharge, their presence in the surface 1a of the negative electrode active material 1 and thus at the negative electrode interface is not preferable. It is thus preferable, in preparing the negative electrode active material 1, to select conditions which facilitate the formation of lithium oxide and impede the formation of lithium hydroxide and lithium carbonate. The preparation method of the negative electrode active material 1 will be described in detail below.

Further, the lithium oxide is preferably present in the region of the negative electrode active material 1a extending 100 to 1000 nm inwardly from the exposed surface of the crystal grain boundaries 3 on the surface 1a of the negative electrode active material 1 in the direction perpendicular to the exposed surface.

The presence of the lithium oxide inside the negative electrode active material 1 increases the contact area between the crystal grains 2 and the crystal grain boundaries 3, thereby further improving the ionic conductivity of the negative electrode active material 1. During charge/discharge, ions are inserted and eliminated into and from the crystal grains 2 adjacent to the lithium oxide. If the region in which the lithium oxide is present exceeds 1000 nm, the active material capacity of the negative electrode active material 1 may become low.

The presence of the lithium oxide can be confirmed, for example, by XPS (X-ray Photoelectron Spectroscopy) or AES (Auger Electron Spectroscopy). Specifically, by checking for O (1 s) peaks in an XPS or AES analysis, the presence or absence of Li—O bonding can be confirmed.

While the grain size of the crystal grains 2 of the negative electrode active material 1 is not particularly limited, its mean grain size is preferably 10 to 1000 nm. When the mean grain size of the crystal grains 2 included in the negative electrode active material 1 is in this range, the contact area of the crystal grains 2 with the crystal grain boundaries 3 can be further enlarged, so the interfacial resistance at the negative electrode interface can be further reduced.

If the mean grain size is less than 10 nm, the active material capacity of the negative electrode active material 1 may become low. On the other hand, if the mean grain size exceeds 1000 nm, the effect of reducing the interfacial resistance may become insufficient. The size (including mean grain size) and area of the crystal grain boundaries and the crystal grains can be determined by subjecting an image observed by a scanning electron microscope (SEM) to image processing.

In the negative electrode active material 1, at least one selected from an inner part of the crystal grain 2, an exposed surface of the crystal grain 2, an inner part of the crystal grain boundary 3, an exposed surface of the crystal grain boundary 3, and a contact part of the crystal grain 2 and the crystal grain boundary 3 may contain unavoidable impurities in addition to the lithium oxide. Unavoidable impurities may be present unless they impair the preferable characteristics of the negative electrode active material 1. Examples of unavoidable impurities include lithium hydroxide, lithium carbonate, lithium nitride, lithium alkoxide, and lithium alkyl carbonate.

The negative electrode active material 1 can be prepared, for example, by controlling the texture of a lithium-based active material. A metal material such as a lithium-based active material is usually an aggregate of a large number of crystals (crystal grains). The texture of a metal is controlled by utilizing, for example, phase change or deposition phenomenon which occurs when a metal is heated, cooled, or heated and cooled. The negative electrode active material 1 is used to form a negative electrode active material layer of a negative electrode of a battery. Thus, in forming a negative electrode active material layer on a negative electrode current collector surface using a lithium-based active material (lithium or a lithium alloy), by selecting various conditions suitably, the production of a negative electrode and synthesis of the negative electrode active material 1 can be simultaneously carried out, which is industrially advantageous.

More specifically, a lithium-based active material layer is formed by placing a molten lithium-based active material on a negative electrode current collector surface, cooling it, rolling the cooled and solidified lithium-based active material, and subjecting it to a post-process such as heating. In such formation of a lithium-based active material layer, by suitably selecting the composition of the lithium-based active material, cooling speed, heating time after rolling, etc., the negative electrode active material 1 can be prepared. The cooling speed as used herein refers to the speed at which the molten lithium-based active material placed on the negative electrode current collector surface is cooled.

For example, when the lithium-based active material is lithium (simple substance), the cooling speed is set to approximately 1.5 to 2.5° C./min, the heating temperature in the post-process to approximately 140 to 160° C., and the heating time after the post-process to approximately 20 to 40 minutes or approximately 4.5 to 5.5 hours, to obtain the negative electrode active material 1.

Also, when the lithium-based active material is a lithium-aluminum alloy, the aluminum content in the alloy is set to 0.1 to 15% by weight, preferably 0.2 to 10% by weight, the cooling speed to approximately 0.001 to 2.5° C./min, the heating temperature in the post-process to approximately 140 to 160° C., and the heating time after the post-process to approximately 5 minutes to 5.5 hours, to obtain the negative electrode active material 1.

Likewise, when using another alloy, by adjusting the composition, cooling speed, heating time, heating temperature, etc. suitably, the negative electrode active material 1 can be produced.

The negative electrode active material 1 thus produced can be used as a negative electrode active material for various batteries, and in particular, it is useful as a negative electrode active material for all solid-state polymer batteries.

[Dry Polymer Electrolyte]

A second embodiment of the invention is the dry polymer electrolyte.

The dry polymer electrolyte of the invention includes (1) an ethylene glycol ether, (2) a polymer containing electron-donating oxygen atoms in the skeleton, and (3) a lithium salt. More specifically, the dry polymer electrolyte of the invention is considered to be a composite of a polymer containing electron-donating oxygen atoms in the skeleton and a lithium salt, the composite containing a composite of the lithium salt and an ethylene glycol ether.

In the dry polymer electrolyte of the invention, the lithium salt is dissociated to a lithium ion and an anion, while being dissolved.

In order to dissociate the lithium salt in the dry polymer electrolyte, it is necessary to create a strong interaction equivalent to the interaction between the lithium ion and the anion. In the invention, such an interaction is created by the use of the polymer containing electron-donating oxygen atoms in the skeleton as the matrix polymer.

That is, the electron-donating oxygen atoms can strongly interact with a lithium ion, thereby dissociating the lithium salt. The dissociated lithium ion is positioned near the electron-donating oxygen atoms, and moves in the polymer structure or on the polymer chain. It is thought that the lithium can move in the matrix polymer due mainly to the segment motion of the polymer chain. Thus, the dry polymer electrolyte of the invention can exhibit excellent ionic conductivity.

An ethylene glycol ether is used mainly for weakening the interaction between the lithium ion and the electron-donating oxygen atoms in the polymer chain and thereby further improving the ionic conductivity of the dry polymer electrolyte. Since the ethylene glycol ether contains ether oxygen, which is an electron-donating oxygen atom, in the molecule, the lithium ion positioned in the polymer chain also interacts with this ether oxygen. As a result, the interaction between the lithium ion and the electron-donating oxygen atoms in the polymer chain is relatively weakened, so that the degree of freedom of the lithium ion increases and lithium ion conductivity improves.

A composite of a lithium salt and an ethylene glycol ether can be isolated as a solid crystalline complex in a specific composition range, although it contains a liquid component. This suggests that in the dry polymer electrolyte of the invention, the ethylene glycol ether is present as a solid, not a liquid, in a specific composition range, by being coordinated to the lithium ion.

Hence, the dry polymer electrolyte of the invention exhibits almost no mass change after being vacuum dried at room temperature, although it contains the ethylene glycol ether, which is a liquid component. As used herein, a crystalline complex refers to a solid molecular compound formed by coordinate bonding.

Of course, good lithium ion conductivity can also occur even in a composition range in which the amount of the ethylene glycol ether used is excessive relative to the lithium salt so that a complex of the lithium salt and the ethylene glycol ether cannot be isolated as a crystalline complex. The main reason for good lithium ion conductivity in such cases is that the ethylene glycol ether is present in liquid form, serving as a lithium-ion conducting path. However, the use of an excessive amount of an ethylene glycol ether tends to result in a liquid leak or the like, and battery safety, reliability, etc. may become low.

The respective components of the dry polymer electrolyte of the invention are specifically described.

As the ethylene glycol ether, at least one selected from the group consisting of methyl monoglyme, methyl diglyme, methyl triglyme, methyl tetraglyme, methyl pentaglyme, ethyl monoglyme, ethyl diglyme, ethyl triglyme, ethyl tetraglyme, and ethoxymethoxyethane is used. The use of these specific ethylene glycol ethers can improve the ionic conductivity of the dry polymer electrolyte.

Among them, ethylene glycol ethers whose repetition number (chain length) n of ethylene oxide chain $(CH_2CH_2O)_n$ is 1 to 4 are preferable. Specifically, preferred are the above-listed ethylene glycol ethers excluding methyl pentaglyme. These ethylene glycol ethers, which have a repetition number n of 1 to 4, have structural features of short ethylene oxide chain and small steric hindrance, which facilitate lithium ion coordination. Thus, the effect of weakening the interaction between the lithium ion and the matrix polymer increases and the effect of improving lithium ion conductivity increases.

It is also possible to use a fluorine-containing ethylene glycol ether in which at least one fluorine atom is substituted in such an ethylene glycol ether as listed above. The use of a fluorine-containing ethylene glycol ether can also produce the effect of improving lithium ion conductivity. Preferable fluorine-containing ethylene glycol ethers have a repetition number n of ethylene oxide chain of 1 to 4.

Since the fluorine atom has high electro negativity, the electron donating ability of the ether oxygen in the fluorine-containing ethylene glycol ether decreases. However, when a fluorine-containing ethylene glycol ether has a repetition number n of ethylene oxide chain of 1 to 4, it has the structural features of small steric hindrance and easy lithium ion coordination. It can therefore weaken the interaction between the lithium ion and the polymer chain (electron-donating oxygen atoms) of the matrix polymer.

The polymer containing electron-donating oxygen atoms in the skeleton is used as the matrix polymer, as described above. The polymer containing electron-donating oxygen atoms in the skeleton can be a polymer containing electron-donating oxygen atoms in one or both of the main chain and a side chain. Examples of electron-donating oxygen atoms include ether oxygen, which is an oxygen atom forming an ether bond, and ester oxygen, which is an oxygen atom forming an ester bond.

Examples of matrix polymers include polyethylene oxide, polypropylene oxide, a copolymer of ethylene oxide and propylene oxide, a polymer having an ethylene oxide unit or a propylene oxide unit, and polycarbonate.

The lithium salt can be one commonly used as a supporting salt in lithium batteries, and examples include $LiClO_4$, $LiBF_4$, $LiPF_6$, $LiAlCl_4$, $LiSbF_6$, $LiSCN$, $LiCF_3SO_3$, $LiAsF_6$, lithium lower aliphatic carboxylates, LiCl, LiBr, LiI, chloroborane lithium, lithium tetraphenylborate, $LiN(CF_2SO_2)_2$, and $LiN(C_2F_5SO_2)_2$.

Among them, in consideration of, for example, chemical stability with respect to the lithium-based active material, $LiN(CF_3SO_2)_2$, $LiN(C_2F_5SO_2)_2$ and $LiClO_4$ are preferable. Since these three kinds of lithium salts are chemically stable with respect to the lithium-based active material, they are unlikely to cause formation of an insulating coating film resulting from the decomposition of the lithium salt dissolved in the polymer electrolyte at the negative electrode interface. It is thus possible to realize a good negative electrode interface with a small interfacial resistance. These lithium salts can be used singly or in combination of two or more of them.

Preferably, the lithium salt is dissolved in the dry polymer electrolyte of the invention, with the lithium ion dissociated from the lithium salt being positioned near the electron-donating oxygen atoms in the matrix polymer. In this case, the molar ratio of the lithium ion per mole of the electron-donating oxygen atoms is preferably 0.01 to 0.125, and more preferably 0.02 to 0.10, and the molar ratio of the ethylene glycol ether per mole of the lithium ion which will be described later is preferably 0.05 to 3, and more preferably 0.1 to 3. Such composition can further improve the ionic conductivity of the dry polymer electrolyte.

If the molar ratio of the lithium ion to the electron-donating oxygen atoms is less than 0.01, the concentration of the lithium ion (conductive species) is low, so the lithium ion conductivity of the polymer electrolyte may also become low. Also, if the molar ratio exceeds 0.125, the polymer electrolyte becomes more crystalline, so the segment motion of the matrix polymer decreases. As a result, the lithium ion conductivity of the polymer electrolyte may become low.

If the molar ratio of the ethylene glycol ether to the lithium ion is less than 0.05, the effect of weakening the interaction between the lithium ion and the matrix polymer becomes insufficient, so the effect of improving lithium ion conductivity may decrease. Also, if the molar ratio exceeds 3, it is higher than the concentrations at which the ethylene glycol ether can be coordinated to the lithium ion, so the ethylene glycol ether is present in liquid form in the dry polymer electrolyte.

As a result, when the dry polymer electrolyte is used in a battery, the battery may have poor safety, poor reliability, etc. The content of the ethylene glycol ether in the dry polymer electrolyte can be controlled, for example, by adjusting the amount of the ethylene glycol ether impregnated into the matrix polymer in the preparation of the dry polymer electrolyte.

In addition to the aforementioned respective components, the dry polymer electrolyte of the invention may contain an additive conventionally used in dry polymer electrolytes, unless the preferable characteristics are impaired. An example of additives is an inorganic filler. An inorganic filler can improve, for example, the mechanical strength and membrane homogeneity of the dry polymer electrolyte, and therefore, ionic conductivity. Examples of inorganic fillers include alumina, silica, and the like. These inorganic fillers can be used singly or in combination of two or more of them.

Also, a porous sheet may be used as a supporting material of the dry polymer electrolyte of the invention. The porous sheet can be one commonly used in the battery field, and examples include non-woven fabric made of polypropylene, polyethylene, polyethylene terephthalate, and polyphenylene sulfide, and microporous films made of polypropylene and polyethylene.

When the dry polymer electrolyte of the invention is vacuum dried at room temperature for 24 hours, the mass of the dry polymer electrolyte preferably decreases at a rate of 3% or less. The mass decrease rate is given by the following formula:

$$\text{mass decrease rate}(\%) = (M_0 - M)/M_0 \times 100$$

wherein $M_0$ represents the mass before vacuum drying and M represents the mass after vacuum drying. Adjusting the mass decrease rate to 3% or less can further improve the ionic conductivity of the dry polymer electrolyte of the invention, and also enhance safety and reliability. In the present specification, the degree of vacuum for vacuum drying is less than 1 Pa.

A solid electrolyte membrane comprising the dry polymer electrolyte of the invention can be formed by a method including, for example, the step of preparing a polymer electrolyte solution, the step of forming a precursor membrane, and the step of impregnating an ethylene glycol ether.

In the step of preparing a polymer electrolyte solution, a lithium salt is added to an organic solvent solution of a matrix polymer to prepare a polymer electrolyte solution. The organic solvent can be any known one, without particular limitation, if it is capable of dissolving the matrix polymer and is inactive with respect to the matrix polymer and the lithium salt. Such examples include nitriles such as acetonitrile, and the like.

In the step of forming a precursor membrane, the polymer electrolyte solution prepared in the previous step is applied onto a substrate having a flat surface, and dried to form a dry polymer electrolyte membrane precursor. This step is performed in the same manner as the formation of a conventional polymer electrolyte membrane. Vacuum drying is preferable as the drying method. It is advantageous to use a battery electrode as the substrate and form a dry polymer electrolyte membrane precursor on the active material layer surface of the electrode, since it can be used without alternation as a battery component after the subsequent impregnation step.

In the step of impregnating an ethylene glycol ether, the electrolyte membrane precursor prepared in the previous step is impregnated with an ethylene glycol ether, and, if necessary, dried. The amount of the ethylene glycol ether impregnated can be adjusted, for example, by drying conditions such as drying temperature, drying time, and degree of vacuum, or the amount of the ethylene glycol ether dropped. The impregnation method is not particularly limited, and examples include a method of immersing the electrolyte membrane precursor in an ethylene glycol ether and a method of dropping an ethylene glycol ether into the electrolyte membrane precursor. Also, vacuum drying is preferable as the drying method. In this way, a solid electrolyte membrane comprising a dry polymer electrolyte of the invention can be formed.

Also, a solid electrolyte membrane comprising a dry polymer electrolyte of the invention can also be formed by reacting a lithium salt with an ethylene glycol ether to synthesize a crystalline complex, mixing the crystalline complex with an organic solvent to prepare a polymer electrolyte solution, applying the polymer electrolyte solution onto a substrate, and drying it.

A third embodiment of the invention is the provision of an amorphous lithium nitride layer. The amorphous lithium nitride layer is provided between the negative electrode and the polymer electrolyte layer in the all solid-state polymer battery of the invention, i.e., at the negative electrode interface.

This can suppress an increase in the interfacial resistance at the negative electrode interface during storage even when using a negative electrode including a lithium-based active material and a dry polymer electrolyte. It is thus possible to suppress an increase in the internal resistance of the battery during storage and provide an all solid-state polymer battery with excellent high-rate discharge characteristics after storage. As used herein, "dry polymer electrolyte" is not limited to the dry polymer electrolyte of the second embodiment of the invention and includes conventionally used dry polymer electrolytes.

Since a lithium nitride is more stable with respect to a lithium-based active material than a dry polymer electrolyte, it can suppress decomposition of the dry polymer electrolyte at the negative electrode interface during storage. Also, since the lithium nitride is amorphous, it can reduce the interfacial resistance. When the lithium nitride layer is amorphous, a change in the state of the lithium ions bound to the nitrogen ions makes the lithium ions less bound in the lithium nitride layer, thereby improving the ionic conductivity. It is thus believed that the lithium ions can move faster at the interface between the negative electrode and the lithium nitride layer, thereby reducing the interfacial resistance.

The amorphous lithium nitride layer can be formed by a method described below. Whether or not the lithium nitride layer is amorphous can be confirmed, for example, by XPS analysis. When the lithium nitride is amorphous, the 1 s spectrum of N obtained by XPS analysis has a maximum peak only from 393.5 to 394.5 eV in the binding energy range of 390.0 to 396.0 eV. In contrast, when the lithium nitride is crystalline $Li_3N$, the 1 s spectrum of N obtained by XPS analysis has maximum peaks from 393.5 to 394.5 eV and from 391.5 to 392.5 eV in the binding energy range of 390.0 to 396.0 eV.

While the thickness of the amorphous lithium nitride layer is not particularly limited, it is preferably 50 to 1000 nm in consideration of enhancing the effect of improving lithium ion conductivity at the negative electrode interface and the effect of suppressing an increase in internal resistance during storage.

Also, the amorphous lithium nitride layer preferably covers 30 to 100% of the negative electrode surface. This can further improve the effect of suppressing an increase in internal resistance during storage. Also, when the negative electrode includes a lithium alloy as the lithium-based active material, the amorphous lithium nitride layer may contain elements derived from the lithium alloy other than lithium and nitrogen.

The all solid-state polymer battery including the amorphous lithium nitride layer can be produced, for example, by production method (A) including an electrolyte formation step, and production method (B) including an electrolyte preparation step and an electrolyte lamination step.

More specifically, production method (A) is characterized by forming a dry polymer electrolyte on the negative electrode surface, and includes a positive electrode preparation step, a negative electrode preparation step, an electrolyte formation step, an electrode assembly preparation step, and a sealing step. In production method (A), all the steps excluding the positive electrode preparation step are performed in a nitrogen supply atmosphere with a nitrogen content of 0.1 to 10% by volume. This allows the formation of an amorphous lithium nitride layer between the negative electrode and the dry polymer electrolyte.

If the nitrogen content in the nitrogen supply atmosphere is less than 0.1% by volume, a lithium nitride layer may not be formed in a reliable manner. On the other hand, if the nitrogen content in the nitrogen supply atmosphere exceeds 10% by volume, a crystalline lithium nitride may form on the negative electrode interface. Also, preferable atmospheres contained in the nitrogen supply atmosphere other than nitrogen are, for example, inert atmospheres such as argon and helium. The respective steps are hereinafter described.

In the positive electrode preparation step, a positive electrode is prepared by forming a positive electrode active material layer on one face of a positive electrode current collector in the thickness direction thereof. While the positive electrode preparation step may be performed in either a nitrogen supply atmosphere or another atmosphere, performing in a nitrogen supply atmosphere is preferable in consideration of working efficiency, etc.

In the negative electrode preparation step, a negative electrode is prepared by forming a negative electrode active material layer on one face of a negative electrode current collector in the thickness direction thereof. More specifically, for example, a negative electrode active material layer is pressed to one face of a negative electrode current collector in the thickness direction thereof. The negative electrode active material layer contains a lithium-based active material. The negative electrode preparation step is performed in a nitrogen supply atmosphere.

In the electrolyte formation step, a dry polymer electrolyte is formed on the surface of the negative electrode active material layer of the negative electrode prepared in the negative electrode preparation step. The formation method is not particularly limited, and an example is a cast method. According to a cast method, a dry polymer electrolyte solution is applied onto a flat surface of a substrate to form a coating layer, and the coating layer is dried to remove the solvent. This gives the negative electrode with the dry polymer electrolyte formed on the surface of the negative electrode active material layer. The electrolyte formation step is performed in a nitrogen supply atmosphere.

In the electrode assembly preparation step, the positive electrode and the negative electrode with the dry polymer electrolyte formed on the surface of the negative electrode active material layer are laminated in such a manner that the positive electrode and the negative electrode face each other with the dry polymer electrolyte therebetween. This gives an electrode assembly. The electrode assembly preparation step is performed in a nitrogen supply atmosphere.

In the sealing step, a seal material is disposed on the periphery of the electrode assembly to seal the electrode assembly.

The sealing step is performed in a nitrogen supply atmosphere. In all solid-state polymer batteries, the positive electrode current collector and the negative electrode current collector are usually designed to be larger than the positive electrode active material layer, the negative electrode active material layer, and the dry polymer electrolyte membrane. Thus, on the periphery of the electrode assembly, the positive electrode current collector and the negative electrode current collector directly face each other. By disposing the seal material therebetween, the positive electrode, the negative electrode, and the dry polymer electrolyte are sealed. This gives an all solid-state polymer battery of the invention.

In production method (A), by performing the electrolyte formation step in a nitrogen supply atmosphere with a nitrogen content of 0.1 to 10% by volume, nitrogen dissolves in the dry polymer electrolyte solution. The dry polymer electrolyte formed on the surface of the negative electrode active material layer thus contains nitrogen. The dry polymer electrolyte is formed in the shape of a membrane on the negative electrode active material layer surface.

Hence, lithium contained in the negative electrode reacts with nitrogen contained in the dry polymer electrolyte, so that a lithium nitride layer is formed at the negative electrode interface. At this time, since the absolute amount of nitrogen is small, an amorphous, not crystalline, lithium nitride is selectively formed. Also, part of the amorphous lithium nitride is formed by direct reaction between nitrogen contained in the nitrogen supply atmosphere and lithium contained in the negative electrode. This is probably how the amorphous lithium nitride layer is formed.

Also, production method (B) is characterized by laminating a previously prepared dry polymer electrolyte on the negative electrode surface, and includes an electrolyte preparation step, a positive electrode preparation step, a negative electrode preparation step, an electrolyte lamination step, an electrode assembly preparation step, and a sealing step. In production method (B), the electrolyte preparation step is performed in a nitrogen atmosphere. Also, the atmosphere in which the positive electrode preparation step is performed is not particularly limited, and, for example, a nitrogen atmosphere or an atmosphere with a nitrogen content of 10% by volume or less may be used, and another atmosphere may be used. Also, the other steps than the electrolyte preparation step and the positive electrode preparation step are performed in an atmosphere with a nitrogen content of 10% by volume or less.

With respect to the atmosphere with a nitrogen content of 10% by volume or less, the kind of the atmosphere is not particularly limited if it has a nitrogen content of 10% by volume or less. Examples include inert gases such as argon and helium, and mixed gases of such inert gas and nitrogen. If the nitrogen content exceeds 10% by volume, a crystalline lithium nitride may be formed. The respective steps are hereinafter described.

In the electrolyte preparation step, a dry polymer electrolyte, preferably a dry polymer electrolyte sheet, is prepared in a nitrogen atmosphere. The preparation method is not particularly limited, and an example is a cast method. According to a cast method, a dry polymer electrolyte solution is applied onto a flat surface of a substrate to form a coating layer, and the coating layer is dried to remove the solvent. This gives a dry polymer electrolyte sheet. The substrate can be, for example, a polyethylene terephthalate film. It is preferable to store the dry polymer electrolyte prepared in this step, which is carried on the substrate, in a nitrogen atmosphere, an atmosphere with a nitrogen content of 10% by volume or less, or the like, and to remove it from the substrate for use when laminating it on the negative electrode in the electrolyte lamination step.

The positive electrode preparation step can be performed in the same manner as the positive electrode preparation step of production method (A) except for the atmosphere. While the atmosphere may be either an atmosphere with a nitrogen content of 10% by volume or less or another atmosphere, an atmosphere with a nitrogen content of 10% by volume or less is preferable in consideration of enhancing working efficiency, etc.

The negative electrode preparation step can be performed in the same manner as the negative electrode preparation step of production method (A) except for the atmosphere. The atmosphere is an atmosphere with a nitrogen content of 10% by volume or less.

In the electrolyte lamination step, the dry polymer electrolyte is laminated on the surface of the negative electrode active material layer of the negative electrode. This step is performed in an atmosphere with a nitrogen content of 10% by volume or less.

The electrode assembly preparation step and the sealing step can be performed in the same manner as the electrode assembly preparation step and the sealing step of production method (A) except for the atmosphere. The atmosphere is an atmosphere with a nitrogen content of 10% by volume or less. This gives an all solid-state polymer battery of the invention.

According to production method (B), by performing the electrolyte preparation step in a nitrogen atmosphere, nitrogen dissolves in the dry polymer electrolyte solution, and the resulting dry polymer electrolyte thus contains nitrogen. In laminating this dry polymer electrolyte on the negative electrode surface, lithium contained in the negative electrode reacts with nitrogen contained in the dry polymer electrolyte, so that a lithium nitride layer is formed at the negative electrode interface. At this time, since the absolute amount of nitrogen is small, an amorphous, not crystalline, lithium nitride is selectively formed.

When a nitrogen-containing atmosphere is used as the atmosphere with a nitrogen content of 10% by volume or less in the electrolyte lamination step, it is thought that nitrogen in the atmosphere may react with lithium in the negative electrode to form an amorphous lithium nitride. This is probably how the amorphous lithium nitride layer is formed.

In production methods (A) and (B), it is preferable to perform aging after the sealing step. This permits reliable and efficient formation of the amorphous lithium nitride layer at the negative electrode interface.

[All Solid-State Polymer Battery]

The all solid-state polymer battery of the invention has the same configuration as conventional all solid-state polymer batteries, except that it includes one or more selected from the group consisting of the negative electrode active material of the first embodiment of the invention, the dry polymer electrolyte of the second embodiment of the invention, and the provision of the amorphous lithium nitride layer of the third embodiment of the invention at the negative electrode interface. It is preferable to include one of the first embodiment of the invention, the second embodiment of the invention, and the third embodiment of the invention.

Figure 2:
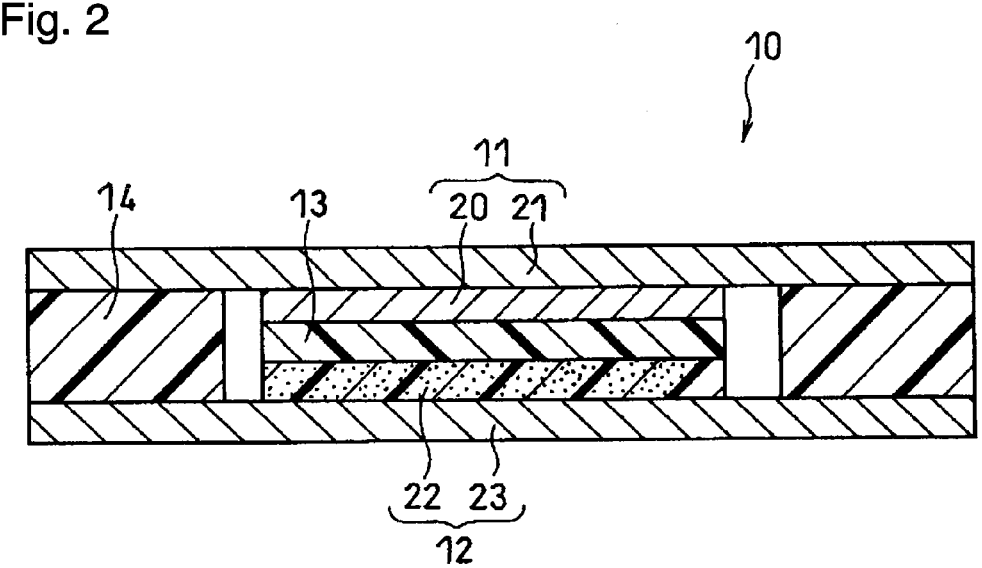
FIG. 2 is a longitudinal sectional view schematically showing the constitution of an all solid-state polymer battery of the invention.

FIG. 2 is a longitudinal sectional view schematically showing the constitution of an all solid-state polymer battery 10 of the invention. The all solid-state polymer battery 10 includes a negative electrode 11, a positive electrode 12, a polymer electrolyte 13, and a seal material 14.

The negative electrode 11 includes a negative electrode active material layer 20 and a negative electrode current collector 21, and is disposed so as to face the positive electrode 12 with the polymer electrolyte 13 therebetween.

The negative electrode active material layer 20 is formed on at least one surface of the negative electrode current collector 21 in the thickness direction thereof. One face of the negative electrode active material layer 20 in the thickness direction is in contact with the negative electrode current collector 21, while the other face is in contact with the polymer electrolyte 13.

The negative electrode active material layer 20 includes a negative electrode active material. Any negative electrode active material commonly used in this field can be used, and examples include lithium-based active materials such as lithium and lithium alloys and the negative electrode active material 1 of the invention. Any lithium alloy commonly used in this field can be used, and examples include a Li—Si alloy, a Li—Sn alloy, a Li—Al alloy, a Li—Ga alloy, a Li—Mg alloy, and a Li—In alloy. These negative electrode active materials can be used singly or in combination of two or more of them.

While the thickness of the negative electrode active material layer 20 is not particularly limited, it is, for example, 1 to 300 μm.

The negative electrode current collector 21 can be a porous or non-porous conductive substrate. Examples of porous conductive substrates include mesh, porous material, non-woven fabric, and woven fabric. Examples of non-porous conductive substrates include metal foil and metal plates. The materials for conductive substrates include, for example, copper, nickel, silver, stainless steel, palladium, gold, and platinum. While the thickness of the negative electrode current collector 21 is not particularly limited, it is, for example, 5 to 200 μm.

The negative electrode 11 can be prepared, for example, by melting a metal sheet comprising a lithium-based active material, placing it on one face of the heated negative electrode current collector 21 in the thickness direction, cooling it, rolling the solidified lithium-based active material to predetermined dimensions, and heat-treating it. At this time, by suitably selecting the composition of the lithium-based active material, cooling speed, heat treatment conditions after rolling, etc., the negative electrode active material layer 20 containing the negative electrode active material 1 of the invention can be obtained, as described above.

The positive electrode 12 includes a positive electrode active material layer 22 and a positive electrode current collector 23, and is disposed so as to face the negative electrode 11 with the polymer electrolyte 13 therebetween.

The positive electrode active material layer 22 is provided on at least one surface of the positive electrode current collector 23 in the thickness direction thereof. The positive electrode active material layer 22 includes a positive electrode active material, and if necessary, it may contain a conductive agent, a binder, etc. One face of the positive electrode active material layer 22 in the thickness direction is in contact with the positive electrode current collector 23, while the other face is in contact with the polymer electrolyte 13. Also, in this embodiment, the positive electrode active material layer 22 is formed on one face of the positive electrode current collector 23 in the thickness direction except for the periphery of the one face.

Any positive electrode active material commonly used in this field can be used. Examples of positive electrode active materials include $(CF)_n$, $(C_2F)_n$, $MnO_2$, $TiS_2$, $MoS_2$, $FeS_2$, $Li_{xa}CoO_2$, $Li_{xa}NiO_2$, $Li_{xa}MnO_2$, $Li_{xa}Co_yNi_{1-y}O_2$, $Li_{xa}Co_yM_{1-y}O_z$, $Li_{xa}Ni_{1-y}M_yO_z$, $Li_{xb}Mn_2O_4$, and $Li_{xb}Mn_{2-y}M_yO_4$, where M is at least one element selected from the group consisting of Na, Mg, Sc, Y, Mn, Fe, Co, Ni, Cu, Zn, Al, Cr, Pb, Sb, and B, xa=0 to 1.2, xb=0 to 2.0, y=0 to 0.9, and z=2.0 to 2.3, vanadium oxides and lithium compounds thereof, niobium oxides and lithium compounds thereof, conjugated polymers which are organic conductive substances, Chevrel phase compounds, and olivine type compounds. These values xa and xb are values before the start of charge/discharge, and increase/decrease due to charge/discharge. These positive electrode active materials can be used singly or in combination of two or more of them.

Examples of conductive agents include graphites such as natural graphite and artificial graphite, carbon blacks such as acetylene black, ketjen black, channel black, furnace black, lamp black, and thermal black, conductive fibers such as carbon fiber and metal fiber, metal powders such as aluminum powder, conductive whiskers such as zinc oxide whisker and potassium titanate whisker (e.g., trade name: DENTALL WK, Otsuka Chemical Co., Ltd.), conductive metal oxides such as titanium oxide, and organic conductive materials such as phenylene derivatives. These conductive agents can be used singly, or if necessary, in combination of two or more of them.

Examples of binders include polyvinylidene fluoride (PVDF), polytetrafluoroethylene, polyethylene, polypropylene, aramid resin, polyamide, polyimide, polyamide-imide, polyacrylonitrile, polyacrylic acid, polymethyl acrylates, polyethyl acrylates, polyhexyl acrylates, polymethacrylic acid, polymethyl methacrylates, polyethyl methacrylates, polyhexyl methacrylates, polyvinyl acetate, polyvinyl pyrrolidone, polyether, polyethersulfone, polyhexafluoropropylene, styrene butadiene rubber, and carboxymethyl cellulose.

As the binder, it is also possible to use a dry polymer electrolyte containing an ethylene glycol ether (preferably a dry polymer electrolyte containing an ethylene glycol ether and having a mass decrease rate after 24-hour vacuum drying at room temperature of 3% or less). This is preferable because ions can easily reach from the surface of the positive electrode 12 to the depths thereof. These binders can be used singly or in combination of two or more of them.

Also, while the thickness of the positive electrode active material layer 22 is not particularly limited, it is, for example, 1 to 100 μm.

The positive electrode current collector 23 can be a porous or non-porous conductive substrate. Examples of porous conductive substrates include mesh, porous material, non-woven fabric, and woven fabric. Examples of non-porous conductive substrates include metal foil and metal plates. The materials for conductive substrates include, for example, stainless steel, aluminum, titanium, silver, copper, nickel, palladium, gold, and platinum. While the thickness of the positive electrode current collector 23 is not particularly limited, it is, for example, 5 to 200 μm.

The positive electrode 12 can be produced, for example, by preparing a positive electrode mixture containing a positive electrode active material and, if necessary, a conductive agent, a binder, etc., and pressing the positive electrode mixture to the positive electrode current collector 23. Also, the positive electrode 12 can also be produced by dissolving or dispersing the positive electrode mixture in a solvent to form a positive electrode mixture slurry, applying the positive electrode mixture slurry onto the surface of the positive electrode current collector 23, drying it, and if necessary, rolling it. Examples of solvents include organic solvents such as N-methyl-2-pyrrolidone, dehydrated N-methyl-2-pyrrolidone, and ethylene glycol ethers, water, and solvent mixtures thereof.

The polymer electrolyte 13 can be the dry polymer electrolyte of the second embodiment of the invention, and can be a conventional polymer electrolyte commonly used in this field. Among conventional polymer electrolytes, a preferable example is a composite of a lithium salt and a polymer that contains oxygen atoms with high electronegativity and an electron-donating ability, such as ether oxygen or ester oxygen, in the molecule (hereinafter referred to as "oxygen-containing polymer").

Generally, in order for a lithium salt to be dissolved and dissociated in a polymer skeleton, a strong interaction between the lithium ion and the polymer skeleton equivalent to the interaction between the lithium ion and the anion thereof is necessary. Oxygen atoms with high electronegativity and an electron-donating ability are relatively negatively charged in a polymer. Thus, the lithium ion is dissociably positioned near the oxygen atoms and the lithium salt is dissolved in the polymer.

When the lithium ion is dissociated from the oxygen atoms in the polymer, the dissociated lithium ion can move in the polymer due to the segment motion of the polymer chain (skeleton). In this way, the dry polymer electrolyte 13, which is a solid electrolyte, exhibits ionic conductivity.

While the oxygen-containing polymer is not particularly limited, preferable examples include polymers having an ethylene oxide unit and/or a propylene oxide unit, such as polyethylene oxide, polypropylene oxide, and a copolymer of ethylene oxide and propylene oxide, and polycarbonate. Among them, the use of a polymer having ether oxygen in a polymer side chain, with the side chain length shortened, is particularly preferable in that efficient lithium ion movement at the negative electrode interface is possible.

Examples of lithium salts to be combined with an oxygen-containing polymer to form a composite include $LiClO_4$, $LiBF_4$, $LiPF_6$, $LiAlCl_4$, $LiSbF_6$, $LiSCN$, $LiCF_3SO_3$, $LiAsF_6$, lithium lower aliphatic carboxylates, LiCl, LiBr, LiI, chloroborane lithium, lithium tetraphenylborate, $LiN(CF_3SO_2)_2$, and $LiN(C_2F_5SO_2)_2$. Among them, for example, $LiN(CF_3SO_2)_2$, $LiN(C_2F_5SO_2)_2$, and $LiClO_4$ are preferable. The use of these lithium salts improves the stability of the polymer electrolyte 13 with respect to the lithium-based active material, thereby providing a good negative electrode interface. These lithium salts can be used singly or in combination of two or more of them.

A composite of an oxygen-containing polymer and a lithium salt can be prepared according to known methods. For example, an oxygen-containing polymer is dissolved in an organic solvent, and the resulting polymer solution and a lithium salt are mixed together. At this time, the ratio of the oxygen-containing polymer to the lithium salt used is not particularly limited, and can be suitably selected depending on the form, kind, performance, use, etc. of the battery produced. For example, the molar ratio of oxygen in the oxygen-containing moiety of the oxygen-containing polymer to lithium ion contained in the lithium salt can be suitably adjusted.

By applying the polymer electrolyte solution obtained by mixing the polymer solution and the lithium salt, for example, onto the surface of the negative electrode active material layer 20 and drying it, the polymer electrolyte 13 is formed on the surface of the negative electrode active material layer 20, so that the negative electrode 11 and the polymer electrolyte 13 can be laminated. While the thickness of the polymer electrolyte 13 is not particularly limited, it is, for example, 10 to 200 μm.

The polymer electrolyte 13 may contain other components unless its characteristics are impaired. For example, with the aim of improving the strength and membrane homogeneity, various inorganic fillers may be added. Addition can further improve ionic conductivity. Examples of inorganic fillers include fine particles such as alumina and silica. Further, a solid crystalline complex of a lithium salt and a glyme may also be contained.

Also, a supporting material of the polymer electrolyte 13 may also be used. The supporting material can be, for example, synthetic resin non-woven fabric or a porous film. Examples of synthetic resin include polypropylene, polyethylene, polyethylene terephthalate, and polyphenylene sulfide.

The seal material 14 is fitted, for example, into the space between the periphery of the positive electrode current collector 23 where the positive electrode active material layer 22 is not formed and the periphery of the negative electrode current collector 21 where the negative electrode active material layer 20 is not formed. This allows sealing of the electrode assembly including the negative electrode 11, the positive electrode 12, and the polymer electrolyte 13. The seal material 14 can be one commonly used in the battery field, and an example is a seal material made of a synthetic resin material.

The all solid-state polymer battery 10 is produced, for example, as follows.

First, the polymer electrolyte 13 is laminated on the surface of the negative electrode 11 on the negative electrode active material layer 20 side. This laminate and the positive electrode 12 are laminated. At this time, they are laminated such that the polymer electrolyte 13 of the laminate and the positive electrode active material layer 22 of the positive electrode 12 face each other. Then, the peripheries of the negative electrode 11 and the positive electrode 12 are sealed with the seal material 14, to obtain the all solid-state polymer battery 10.

Figure 3:
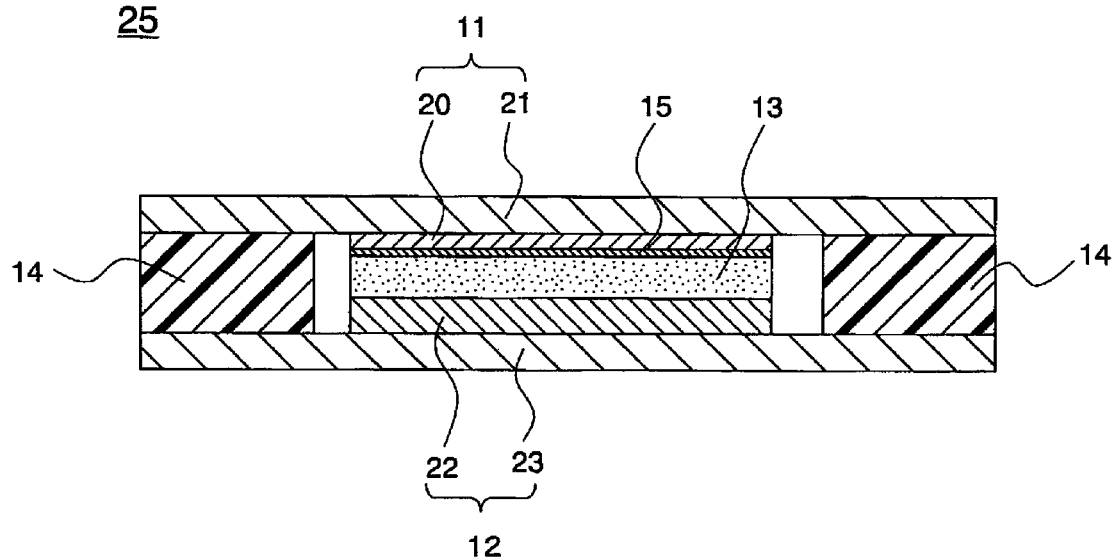
FIG. 3 is a longitudinal sectional view schematically showing the constitution of an all solid-state polymer battery in another embodiment of the invention.

FIG. 3 is a longitudinal sectional view schematically showing the constitution of a flat all solid-state polymer battery 25 in another embodiment of the invention. The all solid-state polymer battery 25 is similar to the all solid-state polymer battery 10, and the corresponding portions are given the same reference characters and their explanations are omitted.

The all solid-state polymer battery 25 includes a negative electrode 11, a positive electrode 12, a polymer electrolyte 13, and a seal material 14. It is characterized in that an amorphous lithium nitride layer 15 of the third embodiment of the invention is formed at the interface between the negative electrode 11 and the polymer electrolyte 13. The amorphous lithium nitride layer 15 has the same configuration as the one as described above.

The negative electrode 11 includes a negative electrode active material layer 20 and a negative electrode current collector 21. The positive electrode 12 includes a positive electrode active material layer 22 and a positive electrode current collector 23. The negative electrode 11 and the positive electrode 12 are disposed so that the negative electrode active material layer 20 and the positive electrode active material layer 22 face each other with the polymer electrolyte 13 therebetween. They form an electrode assembly. The amorphous lithium nitride layer 15 is formed at the negative electrode interface.

In this embodiment, the negative electrode 11, the positive electrode 12, and the polymer electrolyte 13, which form the electrode assembly, are shaped like discs. The negative electrode current collector 21 and the positive electrode current collector 23 are larger in diameter than the positive electrode active material layer 22, the negative electrode active material layer 20, and the polymer electrolyte 13. The seal material 14 is disposed between the periphery of the negative electrode current collector 21 and the periphery of the positive electrode current collector 23, to seal the electrode assembly. Also, the negative electrode current collector 21, the positive electrode current collector 23, and the seal material 14 seal the negative electrode active material layer 20, the positive electrode active material layer 22, and the polymer electrolyte 13.

An example of the above production method (A) is described. The following steps are carried out in an atmosphere with a nitrogen content of 0.1 to 10% by volume. In the positive electrode preparation step, the positive electrode 12 is prepared by applying the positive electrode active material layer 22 on one face of the positive electrode current collector 23. In the negative electrode preparation step, the negative electrode 11 is prepared by pressing the negative electrode active material layer 20 on one face of the negative electrode current collector 21. In the next electrolyte preparation step, the polymer electrolyte 13 is prepared by casting a dry polymer electrolyte solution on the negative electrode active material layer 20 and removing the solvent by drying.

In the electrode assembly preparation step, an electrode assembly is prepared by laminating the positive electrode 12 and the negative electrode 11 with the polymer electrolyte 13 formed on one face such that the negative electrode active material layer 20 and the positive electrode active material layer 22 face each other with the polymer electrolyte 13 therebetween. In the sealing step, the electrode assembly is sealed by disposing the seal material 14 on the periphery of the electrode assembly. In this way, the all solid-state polymer battery 25 is produced.

Next, an example of the above production method (B) is described below. First, in the electrolyte preparation step, the polymer electrolyte 13 is formed on a substrate by casting a dry polymer electrolyte solution on a polyethylene terephthalate (PET) film serving as the substrate in a nitrogen atmosphere, and then removing the solvent by drying. The polymer electrolyte 13 formed on the substrate is moved into an argon atmosphere. All the subsequent steps are carried out in a pure argon atmosphere.

In the positive electrode preparation step, the positive electrode 12 is prepared by applying the positive electrode active material layer 22 on one face of the positive electrode current collector 23. In the negative electrode preparation step, the negative electrode 11 is prepared by pressing the negative electrode active material layer 20 to one face of the negative electrode current collector 21. In the electrolyte lamination step, the polymer electrolyte 13 is removed from the substrate and placed on the negative electrode active material layer 20.

In the electrode assembly preparation step, an electrode assembly is prepared by laminating the positive electrode 12 and the negative electrode 11 with the polymer electrolyte 13 formed on one face such that the negative electrode active material layer 20 and the positive electrode active material layer 22 face each other with the polymer electrolyte 13 therebetween. In the sealing step, the electrode assembly is sealed by disposing the seal material 14 on the periphery of the electrode assembly. In this way, the all solid-state polymer battery 25 is produced.

The constitution and shape of the all solid-state polymer battery of the invention are not limited, and any constitution and shape known in the battery field can be employed. Examples of constitutions include the layered type, the wound type, and the bipolar type. Examples of shapes include the flat shape, the coin shape, the cylindrical shape, the rectangular shape, and the laminate shape. Also, the all solid-state polymer battery of the invention can be produced as either a primary battery or a secondary battery.

EXAMPLES

The invention is hereinafter described in detail by way of Examples, Comparative Examples, and Test Examples. Examples 1 and 2 and Comparative Example 1 relate to the negative electrode active material of the first embodiment of the invention. Also, Examples 3 to 6 and Comparative Examples 2 to 5 pertain to the dry polymer electrolyte of the second embodiment of the invention. Further, Examples 7 to 12 and Comparative Examples 6 to 9 are directed to the amorphous lithium nitride layer of the third embodiment of the invention.

Also, all the operations in Examples 1 to 12 and Comparative Examples 1 to 9 were carried out in an atmosphere whose dew point was controlled at −50° C. or less, and the vacuum drying was performed at a vacuum degree of 0.3 Pa.

Example 1 and Comparative Example 1

(1) Preparation of Negative Electrode Active Material and Preparation of Negative Electrodes 1 to 14 and Comparative Negative Electrodes 1 to 3

In an argon atmosphere, a lithium-based active material foil with a thickness of 300 μm was prepared with an extruder, and heated to 200° C. for melting. The molten lithium-based active material was placed on a heated copper foil with a thickness of 20 μm, and the copper foil was cooled to room temperature at the cooling speeds as listed in Table 1.

Subsequently, a guide with predetermined dimensions (diameter 10 mm) was placed on the face of the copper foil with the lithium-based active material. The lithium-based active material was pressurized and rolled to a thickness of approximately 100 μm and the same dimensions as those of the guide, so that it was pressed to the copper foil serving as the negative electrode current collector. The lithium-based active material foil obtained by the rolling was heated to 150° C. to remove rolling strain. In this way, the preparation of negative electrode active materials and the preparation of negative electrodes 1 to 14 and comparative negative electrodes 1 to 3 were carried out simultaneously. The heating time was as shown in Table 1.

Each of the negative electrodes 1 to 14 and comparative negative electrodes 1 to 3 thus obtained was punched out into a 10-mm diameter disc in such a manner that the lithium-based active material layer did not protrude from the copper foil, to prepare a sample. The surface of this sample was subjected to an SEM observation, an XPS analysis, and an AES analysis, to determine the area of crystal grain boundaries, the position of lithium oxide present at the crystal grain boundaries, and crystal grain size. The results are shown in Table 1. The depth of lithium oxide was measured relative to the surface of the negative electrode (or negative electrode active material), and "0" means that lithium oxide is exposed on the negative electrode surface.

[SEM Observation]

Using a scanning electron microscope (trade name: S-4500, available from Hitachi High-Technologies Corporation), an SEM observation (magnification: 10000 times, acceleration voltage: 3.0 kV) was made to take SEM photos of the surfaces of the negative electrodes 1 to 14 and comparative negative electrodes 1 to 3. In each of the SEM photos taken, given 10 points were subjected to image processing to determine the exposed area of the crystal grain boundaries on the negative electrode surface. For image processing, an image analysis type particle size distribution system (trade name: Mac-View ver 3.5, Mountech Co., Ltd.) was used.

It was confirmed that the exposed area of crystal grain boundaries per square centimeter of the surface of the negative electrodes 1 to 14 was 0.02 to 0.5 $cm^2$. It was also confirmed that the exposed area of crystal grain boundaries per square centimeter of the surface of the comparative negative electrodes 1 and 3 was 0.01 $cm^2$, and that the exposed area of crystal grain boundaries per square centimeter of the surface of the comparative negative electrode 2 was 0.7 $cm^2$.

[XPS Analysis]

An X-ray photoelectron spectroscopic analyzer (trade name: XPS-7000, available from Rigaku Corporation) was used for XPS analysis. The measurement conditions are as follows. X-ray source: Mg—Kα, voltage: 10 kV, current: 10 mA, and X-ray spot size: approximately 9 mm.

Charge correction was made based on the 1s electron binding energy of hydrocarbon or the 2 p electron binding energy of argon used for ion etching (ion etching up to 2000 nm, acceleration voltage: 500 V, angle: 90 degrees, ion current density: 32 μA/cm$^2$, and etching rate: 1 nm/min). Also, the XPS analysis performed for the ion etching was performed in the same manner.

[AES Analysis]

An Auger electron spectroscopic analyzer (trade name: SAM670xi, available from ULVAC-PHI, Inc.) was used for AES analysis. The measurement conditions are as follows. Acceleration voltage: 3 kV, sample current: 10 nA, and beam diameter: approximately 75 nm. Also, the AES analysis performed for ion etching up to 2000 nm at an ion gun acceleration voltage of 3 kV, an etching rate of 10 nm/min, and a sample inclination of 30 degrees was performed in the same manner.

(3) Preparation of Polymer Electrolyte Layer

An acetonitrile solution of polyethylene oxide was prepared by dissolving 1 g of polyethylene oxide (viscosity-average molecular weight 100,000, available from Sigma-Aldrich Corporation) in 10 g of acetonitrile. This acetonitrile solution was mixed with LiN(CF$_3$SO$_2$)$_2$, serving as a lithium salt, such that the molar ratio [Li]/[EO] of the lithium ion concentration [Li] in the lithium salt to the ether oxygen concentration [EO] in the ethylene oxide moiety in the polymer was 1/50, so as to obtain a polymer electrolyte solution.

The polymer electrolyte solution thus obtained was applied by a spin coat method onto each of the negative electrodes 1 to 14 and comparative negative electrodes 1 to 3. It was then vacuum dried at 80° C. for 48 hours to completely remove the solvent component, so that a circular polymer electrolyte layer with a thickness of 30 μm and a diameter of 10 mm was

TABLE 1

| Negative electrode | Composition | Cooling speed (° C./min) | Heating time (min) | Area of crystal grain boundaries*[1] (cm$^2$) | Position of lithium oxide*[2] (nm) | Crystal grain size (nm) |
|---|---|---|---|---|---|---|
| Negative electrode 1 | Li | 2 | 30 | 0.02 | 0 to 200 | 500 |
| Negative electrode 2 | Li—0.2% Al | 2 | 30 | 0.1 | 0 to 200 | 500 |
| Negative electrode 3 | Li—1% Al | 2 | 30 | 0.2 | 0 to 200 | 500 |
| Negative electrode 4 | Li—10% Al | 2 | 30 | 0.5 | 0 to 200 | 500 |
| Negative electrode 5 | Li | 2 | 300 | 0.02 | 5 to 1000 | 500 |
| Negative electrode 6 | Li—0.2% Al | 2 | 10 | 0.1 | 0 to 70 | 500 |
| Negative electrode 7 | Li—0.2% Al | 2 | 20 | 0.1 | 0 to 100 | 500 |
| Negative electrode 8 | Li—0.2% Al | 2 | 60 | 0.1 | 0 to 700 | 500 |
| Negative electrode 9 | Li—0.2% Al | 2 | 90 | 0.1 | 0 to 1000 | 500 |
| Negative electrode 10 | Li—0.2% Al | 2 | 300 | 0.1 | 0 to 2000 | 500 |
| Negative electrode 11 | Li—0.2% Al | 20 | 30 | 0.1 | 0 to 500 | 50 |
| Negative electrode 12 | Li—0.2% Al | 10 | 30 | 0.1 | 0 to 500 | 100 |
| Negative electrode 13 | Li—0.2% Al | 0.01 | 30 | 0.1 | 0 to 500 | 1000 |
| Negative electrode 14 | Li—0.2% Al | 0.001 | 30 | 0.1 | 0 to 500 | 2000 |
| Comparative negative electrode 1 | Li | 2 | 60 | 0.01 | 0 to 700 | 500 |
| Comparative negative electrode 2 | Li—20% Al | 2 | 30 | 0.7 | 0 to 200 | 500 |
| Comparative negative electrode 3 | Li | 2 | 500 | 0.01 | 5 to 1000 | 500 |

*[1]The area of crystal grain boundaries exposed per square centimeter of lithium-based active material surface
*[2]The depth of lithium oxide from active material surface (2) Preparation of Negative Electrode Plate Each of the negative electrodes 1 to 14 and comparative negative electrodes 1 to 3 shown in Table 1 was cut to a 14-mm diameter disc to obtain a negative electrode plate. It should be noted that the lithium-based active material and the copper foil had the center at the same position. Thus, the copper foil was exposed on the periphery of the lithium-based active material of the negative electrode plate.

formed on the negative electrode plate, so as to obtain a laminate of the negative electrode plate and the polymer electrolyte layer (hereinafter referred to as simply a "laminate"). The negative electrode plate and the polymer electrolyte layer had the center at the same position. Hence, on the periphery of the face of the negative electrode plate on which the polymer electrolyte layer was formed, the polymer electrolyte layer was not formed and the copper foil was thus exposed.

(4) Production of all Solid-State Polymer Primary Battery

A positive electrode mixture paste was prepared by dissolving or dispersing electrolytic manganese dioxide subjected to a heat treatment of 400° C. ($MnO_2$, positive electrode active material), acetylene black (conductive agent), a polyethylene oxide binder with an average molecular weight of 100,000 (viscosity-average molecular weight 100,000, available from Sigma-Aldrich Corporation), and $LiN(CF_3SO_2)_2$ in acetonitrile, and kneading them. They were blended such that $MnO_2$:acetylene black:polymer electrolyte=70:20:10% by mass. The mass of the polymer electrolyte used herein was the mass calculated based on the solid content.

The positive electrode mixture paste thus obtained was applied onto one face of a 20-μm thick aluminum foil (positive electrode current collector) and dried at 120° C. for 24 hours. This was rolled with a roll press to form a positive electrode active material layer of 10 μm in thickness, so as to obtain an electrode film. The electrode film was cut to a 14-mm diameter disc, which was then subjected to a separation process such that the diameter of the positive electrode active material layer was 10 mm, to prepare a positive electrode plate in which the aluminum foil was exposed on the periphery thereof. The positive electrode active material layer and the aluminum foil had the center at the same position.

Subsequently, the laminate of the negative electrode plate and the polymer electrolyte layer obtained in the above manner and the positive electrode plate were laminated so that the polymer electrolyte layer and the positive electrode active material layer faced each other. Then, a seal material shaped like a window flame and made of an insulating resin film was disposed between the exposed part of the negative electrode plate periphery and the positive electrode plate periphery. The seal material was then melted and bonded for sealing between the positive electrode plate and the negative electrode plate. In this way, flat all solid-state polymer primary batteries were produced.

The flat all solid-state polymer primary batteries including the negative electrode plates prepared from the negative electrodes 1 to 14 are designated as batteries 1 to 14, respectively. Also, the flat all solid-state polymer primary batteries including the negative electrode plates prepared from the comparative negative electrodes 1 to 3 are designated as comparative batteries 1 to 3, respectively.

Test Example 1

The batteries 1 to 14 and comparative batteries 1 to 3 were subjected to a discharge test at room temperature, a constant current of 10 μA, and an end-of-discharge voltage of 2.0 V, to measure battery capacity. Also, using an electrochemical measurement system, 1255WB type, available from Solartron Metrology, the alternating-current impedances of the batteries were measured before and after the discharge test. As a result, the Nyqist plot in the frequency range of 0.01 Hz to 1 MHz showed an arc.

On the assumption that the real axis intercept of this arc on the high frequency side is electrolyte resistance, and the real axis intercept on the low frequency side is the total of electrolyte resistance and interfacial resistance, interfacial resistance values were calculated from the values of these intercepts. Table 2 shows the results. Table 2 also shows "Area of crystal grain boundaries", "Position of lithium oxide" and "Crystal grain size" shown in Table 1.

TABLE 2

|  |  | Negative electrode active material | Area of crystal grain boundaries[1] ($cm^2$) | Position of lithium oxide[2] (nm) | Crystal grain size (nm) | Interfacial resistance (Ω) | | Battery capacity (mAh) |
|---|---|---|---|---|---|---|---|---|
|  |  |  |  |  |  | Before discharge | After discharge |  |
| Battery | 1 | Negative electrode 1 | 0.02 | 0 to 200 | 500 | 200 | 600 | 0.88 |
|  | 2 | Negative electrode 2 | 0.1 | 0 to 200 | 500 | 180 | 590 | 0.85 |
|  | 3 | Negative electrode 3 | 0.2 | 0 to 200 | 500 | 160 | 370 | 0.81 |
|  | 4 | Negative electrode 4 | 0.5 | 0 to 200 | 500 | 140 | 350 | 0.80 |
|  | 5 | Negative electrode 5 | 0.02 | 5 to 1000 | 500 | 240 | 710 | 0.74 |
|  | 6 | Negative electrode 6 | 0.1 | 0 to 70 | 500 | 200 | 710 | 0.71 |
|  | 7 | Negative electrode 7 | 0.1 | 0 to 100 | 500 | 190 | 640 | 0.82 |
|  | 8 | Negative electrode 8 | 0.1 | 0 to 700 | 500 | 150 | 390 | 0.81 |
|  | 9 | Negative electrode 9 | 0.1 | 0 to 1000 | 500 | 140 | 360 | 0.80 |
|  | 10 | Negative electrode 10 | 0.1 | 0 to 2000 | 500 | 130 | 330 | 0.70 |
|  | 11 | Negative electrode 11 | 0.1 | 0 to 500 | 50 | 120 | 530 | 0.73 |
|  | 12 | Negative electrode 12 | 0.1 | 0 to 500 | 100 | 170 | 550 | 0.85 |
|  | 13 | Negative electrode 13 | 0.1 | 0 to 500 | 1000 | 190 | 600 | 0.85 |
|  | 14 | Negative electrode 14 | 0.1 | 0 to 500 | 2000 | 210 | 630 | 0.71 |
| Comp. Battery | 1 | Comparative negative electrode 1 | 0.01 | 0 to 700 | 500 | 260 | 1220 | 0.24 |

TABLE 2-continued

| Negative electrode active material | Area of crystal grain boundaries*[1] (cm²) | Position of lithium oxide*[2] (nm) | Crystal grain size (nm) | Interfacial resistance (Ω) Before discharge | Interfacial resistance (Ω) After discharge | Battery capacity (mAh) |
|---|---|---|---|---|---|---|
| 2 Comparative negative electrode 2 | 0.7 | 0 to 200 | 500 | 110 | 290 | 0.39 |
| 3 Comparative negative electrode 3 | 0.01 | 5 to 1000 | 500 | 320 | 1570 | 0.71 |

*[1]The area of crystal grain boundaries exposed per square centimeter of lithium-based active material surface
*[2]The depth of lithium oxide from active material surface In Table 2, a comparison between the batteries 1 to 4 and the comparative batteries 1 and 2 indicates that the 0.02 to 0.5 cm² exposed area of crystal grain boundaries per square centimeter of lithium-based active material surface permits a reduction in interfacial resistance value before and after the discharge test, thus heightening the capacity of the all solid-state lithium primary battery. This is probably because the highly ion-conductive crystal grain boundaries serve as ion conducting paths at the negative electrode interface during discharge, contributing to improving battery characteristics.

Also, a comparison between the batteries 1 and 5 and the comparative battery 3 shows that the presence of lithium oxide on at least the outermost surface of the lithium-based active material can reduce the interfacial resistance value before and after the discharge test, consequently heightening the capacity of the all solid-state lithium primary battery. This is probably because lithium oxide present in the crystal grain boundaries has high lithium ion conductivity, and the presence of lithium oxide on the outermost surface, which is at the negative electrode interface, makes the negative electrode interface a good ion conducting path.

Also, a comparison between the battery 2 and the batteries 6 to 10 reveals that it is more preferable that the lithium oxide present in the crystal grain boundaries be present in the region extending 100 to 1000 nm inwardly from the lithium-based active material surface. The presence of lithium oxide in the aforementioned region can reduce the interfacial resistance value before and after the discharge test, consequently heightening the capacity of the all solid-state lithium primary battery. This is probably because the presence of lithium oxide in a deeper region of the active material can enlarge the contact area of the crystal grains of the lithium-based active material and the crystal grain boundaries, thus increasing the area of the sites serving as the ion conducting paths.

Also, a comparison between the battery 2 and the batteries 11 to 14 indicates that the 100 to 1000 nm crystal grain size, i.e., mean crystal grain size, of the lithium-based active material permits a reduction in interfacial resistance value before and after the discharge test, consequently heightening the capacity of the all solid-state lithium primary battery. This is probably because even when the ratio of the crystal grain boundaries to the negative electrode active material surface is the same, a decrease in crystal grain size results in an increase in the area of the crystal grains in contact with the crystal grain boundaries.

Example 2

Production of all Solid-State Polymer Secondary Battery

A positive electrode mixture paste was prepared in the same manner as in Example 1, except for the use of spinel-type lithium manganate ($LiMn_2O_4$) as the positive electrode active material in place of electrolytic manganese dioxide. Using the positive electrode mixture paste obtained and a 20-μm thick aluminum foil (positive electrode current collector), an electrode film including a 10-μm thick positive electrode active material layer was prepared in the same manner as in Example 1, and cut to a 10-mm diameter disc to prepare a positive electrode plate.

Flat all solid-state polymer secondary batteries were produced in the same manner as in Example 1, except for the use of the positive electrode plate thus obtained. The flat all solid-state polymer secondary batteries including the negative electrode plates prepared from the negative electrodes 1 to 14 are designated as batteries 15 to 28, respectively. Also, the flat all solid-state polymer secondary batteries including the negative electrode plates prepared from the comparative negative electrodes 1 to 3 are designated as comparative batteries 4 to 6, respectively.

Test Example 2

The batteries 15 to 28 and comparative batteries 4 to 6 were subjected to a 30 cycle charge/discharge test at room temperature, a constant current of 10 μA, and an end-of-discharge voltage of 3.5 V, to obtain capacity retention rate. Capacity retention rate was calculated as the percentage of the discharge capacity at the 30$^{th}$ cycle relative to the discharge capacity at the 2$^{nd}$ cycle (%, [discharge capacity at the 30$^{th}$ cycle/discharge capacity at the 2$^{nd}$ cycle]×100). Also, using an electrochemical measurement system, 1255WB type, available from Solartron Metrology, the alternating-current impedances of the batteries were measured before and after the charge/discharge test.

As a result, the Nyqist plot in the frequency range of 0.01 Hz to 1 MHz showed an arc. On the assumption that the real axis intercept of this arc on the high frequency side is electrolyte resistance, and the real axis intercept on the low frequency side is the total of electrolyte resistance and interfacial resistance, interfacial resistance values were calculated from the values of these intercepts. Table 3 shows the results. Table 3 also shows "Area of crystal grain boundaries", "Position of lithium oxide" and "Crystal grain size" shown in Table 1.

TABLE 3

|  |  | Negative electrode active material | Area of crystal grain boundaries*1 (cm²) | Position of lithium oxide*2 (nm) | Crystal grain size (nm) | Interfacial resistance (Ω) | | Capacity retention rate (%) |
| --- | --- | --- | --- | --- | --- | --- | --- | --- |
|  |  |  |  |  |  | After 2 cycles | After 30 cycles |  |
| Battery | 15 | Negative electrode 1 | 0.02 | 0 to 200 | 500 | 710 | 850 | 84 |
|  | 16 | Negative electrode 2 | 0.1 | 0 to 200 | 500 | 700 | 820 | 85 |
|  | 17 | Negative electrode 3 | 0.2 | 0 to 200 | 500 | 690 | 800 | 83 |
|  | 18 | Negative electrode 4 | 0.5 | 0 to 200 | 500 | 660 | 790 | 81 |
|  | 19 | Negative electrode 5 | 0.02 | 5 to 1000 | 500 | 770 | 910 | 80 |
|  | 20 | Negative electrode 6 | 0.1 | 0 to 70 | 500 | 760 | 890 | 73 |
|  | 21 | Negative electrode 7 | 0.1 | 0 to 100 | 500 | 720 | 850 | 84 |
|  | 22 | Negative electrode 8 | 0.1 | 0 to 700 | 500 | 680 | 800 | 83 |
|  | 23 | Negative electrode 9 | 0.1 | 0 to 1000 | 500 | 650 | 790 | 81 |
|  | 24 | Negative electrode 10 | 0.1 | 0 to 2000 | 500 | 620 | 740 | 76 |
|  | 25 | Negative electrode 11 | 0.1 | 0 to 500 | 50 | 660 | 770 | 74 |
|  | 26 | Negative electrode 12 | 0.1 | 0 to 500 | 100 | 690 | 810 | 85 |
|  | 27 | Negative electrode 13 | 0.1 | 0 to 500 | 1000 | 730 | 860 | 83 |
|  | 28 | Negative electrode 14 | 0.1 | 0 to 500 | 2000 | 790 | 910 | 78 |
| Comp. Battery | 4 | Comparative negative electrode 1 | 0.01 | 0 to 700 | 500 | 910 | 1370 | 41 |
|  | 5 | Comparative negative electrode 2 | 0.7 | 0 to 200 | 500 | 590 | 740 | 54 |
|  | 6 | Comparative negative electrode 3 | 0.01 | 5 to 1000 | 500 | 1030 | 1590 | 36 |

In Table 3, a comparison between the batteries 15 to 18 and the comparative batteries 4 and 5 shows that the 0.02 to 0.5 cm² exposed area of crystal grain boundaries per square centimeter of lithium-based active material surface permits suppression of an increase in interfacial resistance due to repeated charge/discharge cycles, and allows an improvement in capacity retention rate. This is probably because the highly ion-conductive crystal grain boundaries serve as ion conducting paths at the negative electrode interface during charge/discharge, contributing to improving battery characteristics.

Also, a comparison between the batteries 15 and 19 and the comparative battery 6 shows that the presence of lithium oxide on at least the surface of the lithium-based active material permits suppression of an increase in interfacial resistance due to repeated charge/discharge cycles, consequently improving capacity retention rate. This is probably because lithium oxide present in the crystal grain boundaries has high lithium ion conductivity, and the exposure of lithium oxide on the surface, which is at the negative electrode interface, makes the negative electrode interface a good ion conducting path.

Also, a comparison between the battery 16 and the batteries 20 to 24 indicates that the presence of lithium oxide included in the crystal grain boundaries in the region extending 100 to 1000 nm inwardly from the negative electrode active material surface permits suppression of an increase in interfacial resistance due to repeated charge/discharge cycles, consequently improving capacity retention rate. This is probably because the presence of lithium oxide in a deeper region of the negative electrode active material enlarges the contact area of the crystal grains of the lithium-based active material and the crystal grain boundaries, thus increasing the area of the sites serving as the ion conducting paths.

Also, a comparison between the battery 16 and the batteries 25 to 28 indicates that the 100 to 1000 nm crystal grain size, i.e., mean crystal grain size, of the lithium-based active material permits suppression of an increase in interfacial resistance due to repeated charge/discharge cycles, consequently improving capacity retention rate. This is probably because even when the ratio of the crystal grain boundaries to the active material surface is the same, a decrease in crystal grain size results in an increase in the area of the crystal grains in contact with the crystal grain boundaries.

Example 3 and Comparative Example 2

Preparation and Evaluation of Dry Polymer Electrolyte

An acetonitrile solution of polyethylene oxide was prepared by dissolving 10 g of polyethylene oxide (matrix polymer, viscosity-average molecular weight 100,000, available from Sigma-Aldrich Corporation) in 100 g of acetonitrile.

This acetonitrile solution was mixed with $LiN(CF_3SO_2)_2$ so that the molar ratio [Li/EO] of the lithium ion concentration [Li] to the ether oxygen concentration [EO] was in the range of 0.005 to 0.125, as shown in Table 4, so as to obtain a polymer electrolyte solution. As used herein, the ether oxygen concentration [EO] refers to the ether oxygen concentration in the ethylene oxide moiety in the matrix polymer.

The polymer electrolyte solution obtained was cast in a stainless steel container. It was then vacuum dried at 85° C. for 24 hours to remove the acetonitrile, so as to prepare a solvent-free dry polymer electrolyte.

This dry polymer electrolyte was impregnated with methyl monoglyme (hereinafter referred to as "MMG"), benzene, toluene, or hexane by dropping it so that the molar ratio [Sol/Li] of the ethylene glycol ether concentration [Sol] to the lithium ion concentration [Li] was in the range of 0 to 5, as shown in Table 4. In this way, dry polymers of the invention and comparative electrolytes were prepared as shown in Table 4. They were then vacuum dried at room temperature for 24 hours. In Table 4, MMG, benzene, toluene, and hexane are collectively referred to as solvent components for convenience sake.

[Solvent Component Content and Mass Decrease Rate]

In the above polymer electrolyte preparation step, the mass (M) of the polymer electrolyte before the solvent component impregnation, the mass ($M_1$) of the polymer electrolyte after the solvent component impregnation, and the mass ($M_2$) of the polymer electrolyte after the solvent component impregnation and the 24-hour vacuum drying at room temperature were measured to determine solvent component content (mass %) and mass decrease rate (mass %). Solvent component content and mass decrease rate were determined according to the following equations. Table 4 shows the results.

Solvent component content(mass %)=$(M_1-M)/M_1 \times 100$

Mass decrease rate(mass %)=$(M_1-M_2)/M_1 \times 100$

[Measurement of Conductivity]

A measurement cell was produced by pressing a stainless steel electrode to the inner face of a stainless steel container with a dry polymer electrolyte of the invention or a comparative electrolyte therebetween. The dry polymer electrolyte of the invention used was one which was impregnated with a solvent component but not subjected to a 24-hour vacuum drying at room temperature. This measurement cell was mounted in an electrochemical measurement system (trade name: 125WB type, available from Solartron Metrology), and the conductivity of the dry polymer electrolyte was measured by the alternating-current impedance method. Since conductivity and lithium ion conductivity correlate to each other, conductivity serves as a measure of lithium ion conductivity. Table 4 shows the results.

TABLE 4

| | No. | Li salt | Solvent component | Solvent component content (% by mass) | Mass decrease rate (% by mass) | Sol/Li | Li/EO | Conductivity × $10^5$ (S/cm) |
|---|---|---|---|---|---|---|---|---|
| Electrolyte of the invention | 1 | $LiN(CF_3SO_2)_2$ | MMG | 0.07 | 0.01 | 0.01/1 | 0.05/1 | 1.6 |
| | 2 | $LiN(CF_3SO_2)_2$ | MMG | 3.1 | 0.2 | 0.05/1 | 0.05/1 | 2.8 |
| | 3 | $LiN(CF_3SO_2)_2$ | MMG | 7.7 | 0.5 | 1/1 | 0.05/1 | 2.9 |
| | 4 | $LiN(CF_3SO_2)_2$ | MMG | 15.4 | 1.0 | 2/1 | 0.05/1 | 3.0 |
| | 5 | $LiN(CF_3SO_2)_2$ | MMG | 23.1 | 3.0 | 3/1 | 0.05/1 | 3.1 |
| | 6 | $LiN(CF_3SO_2)_2$ | MMG | 17.8 | 0.1 | 1/1 | 0.2/1 | 2.7 |
| | 7 | $LiN(CF_3SO_2)_2$ | MMG | 14.1 | 0.2 | 1/1 | 0.125/1 | 1.0 |
| | 8 | $LiN(CF_3SO_2)_2$ | MMG | 1.9 | 0.1 | 1/1 | 0.01/1 | 2.7 |
| | 9 | $LiN(CF_3SO_2)_2$ | MMG | 1.0 | 0.1 | 1/1 | 0.005/1 | 2.6 |
| Comparative electrolyte | 1 | $LiN(CF_3SO_2)_2$ | None | — | — | — | 0.05/1 | 0.2 |
| | 2 | $LiN(CF_3SO_2)_2$ | None | — | — | — | 0.2/1 | 0.1 |
| | 3 | $LiN(CF_3SO_2)_2$ | None | — | — | — | 0.125/1 | 0.2 |
| | 4 | $LiN(CF_3SO_2)_2$ | None | — | — | — | 0.01/1 | 0.2 |
| | 5 | $LiN(CF_3SO_2)_2$ | None | — | — | — | 0.005/1 | 0.1 |
| | 6 | $LiN(CF_3SO_2)_2$ | MMG | 61.9 | 41.6 | 5/1 | 0.05/1 | 20.5 |
| | 7 | $LiN(CF_3SO_2)_2$ | MMG | 30.9 | 10.6 | 4/1 | 0.05/1 | 14.7 |
| | 8 | $LiN(CF_3SO_2)_2$ | Benzene | 6.7 | 6.6 | 1/1 | 0.05/1 | 7.7 |
| | 9 | $LiN(CF_3SO_2)_2$ | Toluene | 7.9 | 7.7 | 1/1 | 0.05/1 | 8.2 |
| | 10 | $LiN(CF_3SO_2)_2$ | Hexane | 9.0 | 8.7 | 1/1 | 0.05/1 | 8.3 |

In Table 4, a comparison between the electrolytes 1 to 5 and 6 to 9 of the invention and the comparative electrolytes 1 and 2 to 5 shows that impregnating a polymer electrolyte with methyl monoglyme, which is an ethylene glycol ether, can provide a dry polymer electrolyte with improved conductivity. This is probably because methyl monoglyme impregnation can reduce the strong interaction between the lithium ion and the polymer skeleton.

Also, a comparison between the electrolytes 1 to 5 of the invention and the comparative electrolytes 1 and 6 to 7 indicates that impregnating a polymer electrolyte with methyl monoglyme at a molar ratio [Sol/Li] of 3 or less results in a mass decrease of 3% or less after 24-hour vacuum drying at room temperature, whereas methyl monoglyme impregnation at a [Sol/Li] ratio of greater than 3 results in a very large mass decrease.

When an ethylene glycol ether is impregnated at a [Sol/Li] ratio of 3 or less, the ethylene glycol ether is present in solid state in the dry polymer electrolyte while being coordinated to the lithium ion. On the other hand, if an ethylene glycol ether is impregnated at a [Sol/Li] ratio of greater than 3, such concentration is beyond the concentration at which the ethylene glycol ether can be coordinated to the lithium ion, and thus the ethylene glycol ether is present in free liquid state in the polymer electrolyte. In this way, whether the ethylene glycol ether is present in solid state or liquid state is thought to make a difference in mass decrease.

It should be noted that if the ethylene glycol ether is present in liquid state in the polymer electrolyte, the ethylene glycol ether exhibits the effect of reducing the strong interaction between the lithium ion and the polymer skeleton. Also, since the ethylene glycol ether is liquid, it serves by itself as a lithium ion transportation medium, thereby providing very high lithium ion conductivity.

However, the presence of liquid in the polymer electrolyte is not preferable, since it promotes the occurrence of a liquid leak and the like and lowers battery safety, reliability and the like. Also, a polymer electrolyte containing a liquid is usually called a gel electrolyte, not a dry polymer electrolyte.

Also, a comparison between the electrolyte 3 of the invention and the comparative electrolytes 8 to 10 shows that impregnating a polymer electrolyte with methyl monoglyme results in a mass decrease of 3% or less after 24-hour vacuum drying at room temperature, whereas impregnation of benzene, toluene, or hexane results in a very large mass decrease. This is probably because the ethylene glycol ether, coordinated to the lithium ion, is present in solid state in the polymer electrolyte, whereas in the case of benzene, toluene, or hexane impregnation, the benzene, toluene, or hexane is present in free liquid state in the polymer electrolyte.

The above results demonstrate that the use of a dry polymer electrolyte containing an ethylene glycol ether and having a mass decrease rate after 24-hour vacuum drying at room temperature of 3% or less can provide safety, high reliability, and higher lithium ion conductivity.

Also, a comparison between the electrolytes 1 to 5 of the invention and the comparative electrolyte 1 indicates that impregnating a polymer electrolyte with methyl monoglyme at a [Sol/Li] ratio of 0.05 to 3 can provide a dry polymer electrolyte with further improved conductivity. This is probably because ethylene glycol ether impregnation at a [Sol/Li] ratio of 0.05 or more increases the effect of reducing the strong interaction between the lithium ion and the polymer skeleton.

Also, the conductivity measurement results of the electrolytes 3 and 6 to 9 of the invention reveal that a dry polymer electrolyte in which lithium ions are positioned in the skeleton of the matrix polymer containing ether oxygen has high conductivity when the ratio of the number of moles of the lithium salt to the number of moles of the ether oxygen in the matrix polymer is from 0.01 to 0.125.

If the ratio of the number of moles of the lithium salt to the number of moles of the ether oxygen in the matrix polymer exceeds 0.125, the conductivity becomes low probably because the dry polymer electrolyte becomes more crystalline and the segment motion of the polymer chain (matrix polymer skeleton) decreases. On the other hand, if the ratio of the number of moles of the lithium salt is less than 0.01, the conductivity becomes low probably because the concentration of lithium ions (conducting species) becomes low.

A dry polymer electrolyte in which lithium ions are positioned in the polymer skeleton containing ether oxygen has a further improved conductivity when the ratio of the number of moles of the lithium salt to the number of moles of the ether oxygen is from 0.01 to 0.125 and the ratio of the number of moles of the ethylene glycol ether to the number of moles of the lithium salt is from 0.05 to 3.

Example 4 and Comparative Example 3

Dry polymer electrolytes of the invention and comparative electrolytes were prepared in the same manner as in Example 1, except that $LiN(CF_3SO_2)_2$, $LiN(C_2F_5SO_2)_2$, $LiClO_4$, $LiBF_4$, or $LiPF_6$ was used as the lithium salt, that methyl monoglyme (MMG), methyl diglyme (MDG), methyl triglyme (MTG), methyl tetraglyme (MTeG), methyl pentaglyme (MPG), ethyl monoglyme (EMG), ethyl diglyme (EDG), ethyl triglyme (ETG), ethyl tetraglyme (ETeG), ethoxymethoxyethane (EME), or fluoroethoxymethoxyethane (FEME) was used as the ethylene glycol ether impregnated into the dry polymer electrolyte, and that they were used at molar ratios shown in Table 5.

These electrolytes were measured for solvent component content (mass %), mass decrease rate (mass %), and conductivity. Table 5 shows the results. Table 5 also shows the data on the invention electrolyte 3 of Example 3 and the comparative electrolyte 1 of Comparative Example 2.

TABLE 5

| | | | Electrolyte | | | | |
|---|---|---|---|---|---|---|---|
| No. | | Li salt | Solvent component | Solvent component content (% by mass) | Mass decrease rate (% by mass) | Sol/Li | Li/EO | Conductivity × $10^5$ (S/cm) |
| Electrolyte of the invention | 3 | $LiN(CF_3SO_2)_2$ | MMG | 7.7 | 0.5 | 1/1 | 0.05/1 | 2.9 |
| | 11 | $LiN(CF_3SO_2)_2$ | MDG | 10.1 | 0.4 | 1/1 | 0.05/1 | 2.6 |
| | 12 | $LiN(CF_3SO_2)_2$ | MTG | 13.9 | 0.4 | 1/1 | 0.05/1 | 2.6 |
| | 13 | $LiN(CF_3SO_2)_2$ | MTeG | 17.7 | 0.3 | 1/1 | 0.05/1 | 2.7 |
| | 14 | $LiN(CF_3SO_2)_2$ | MPG | 25.2 | 0.2 | 1/1 | 0.05/1 | 1.1 |
| | 15 | $LiN(CF_3SO_2)_2$ | EMG | 10.1 | 0.4 | 1/1 | 0.05/1 | 2.9 |
| | 16 | $LiN(CF_3SO_2)_2$ | EDG | 13.9 | 0.4 | 1/1 | 0.05/1 | 2.6 |
| | 17 | $LiN(CF_3SO_2)_2$ | ETG | 17.7 | 0.3 | 1/1 | 0.05/1 | 2.5 |
| | 18 | $LiN(CF_3SO_2)_2$ | ETeG | 25.2 | 0.2 | 1/1 | 0.05/1 | 2.5 |
| | 19 | $LiN(CF_3SO_2)_2$ | EME | 8.9 | 0.2 | 1/1 | 0.05/1 | 2.4 |
| | 20 | $LiN(CF_3SO_2)_2$ | FEME | 12.4 | 0.5 | 1/1 | 0.05/1 | 2.1 |
| | 21 | $LiN(CF_3SO_2)_2$ | MMG | 7.1 | 0.5 | 1/1 | 0.05/1 | 2.9 |
| | 22 | $LiClO_4$ | MMG | 9.1 | 0.5 | 1/1 | 0.05/1 | 2.9 |
| | 23 | $LiBF_4$ | MMG | 9.5 | 0.7 | 1/1 | 0.05/1 | 2.7 |
| | 24 | $LiPF_6$ | MMG | 15.4 | 0.6 | 1/1 | 0.05/1 | 2.6 |
| Comparative electrolyte | 1 | $LiN(CF_3SO_2)_2$ | None | — | — | — | 0.05/1 | 0.2 |
| | 11 | $LiN(CF_3SO_2)_2$ | None | — | — | — | 0.05/1 | 0.2 |
| | 12 | $LiClO_4$ | None | — | — | — | 0.05/1 | 0.2 |
| | 13 | $LiBF_4$ | None | — | — | — | 0.05/1 | 0.1 |
| | 14 | $LiPF_6$ | None | — | — | — | 0.05/1 | 0.1 |

In Table 5, a comparison between the electrolytes 3 and 11 to 20 of the invention and the comparative electrolyte 1 shows that the use of methyl monoglyme, methyl diglyme, methyl triglyme, methyl tetraglyme, methyl pentaglyme, ethyl monoglyme, ethyl diglyme, ethyl triglyme, ethyl tetraglyme, ethoxymethoxyethane, or the like as the ethylene glycol ether included in the polymer electrolyte can provide higher lithium ion conductivity. These ethylene glycol ethers contain electron-donating oxygen, being capable of reducing the strong interaction between the lithium ion and the matrix polymer skeleton. Probably for this reason, they have the effect of improving lithium ion conductivity.

Among them, methyl monoglyme, methyl diglyme, methyl triglyme, methyl tetraglyme, ethyl monoglyme, ethyl diglyme, ethyl triglyme, ethyl tetraglyme, and ethoxymethoxyethane are preferable since they are more effective in improving lithium ion conductivity. These ethylene glycol ethers have a short chain length, with n, which represents the length of the ethylene oxide chain ($CH_2CH_2O$) n, being 1 to 4, and have small steric hindrance. Hence, they can be easily coordinated to the lithium ion. Probably for this reason, the effect of reducing the strong interaction between the lithium ion and the matrix polymer skeleton increases, thereby further improving lithium ion conductivity.

A comparison between the electrolyte 20 of the invention and the comparative electrolyte 1 indicates that the use of a fluorine-containing ethylene glycol ether which contains at least one fluorine atom as the ethylene glycol ether included in the polymer electrolyte also has the effect of improving lithium ion conductivity. In the fluorine-containing ethylene glycol ether, a fluorine atom has high electronegativity, the electron-donating ability of the ether oxygen decreases. However, since the fluorine-containing ethylene glycol ether has a short ethylene oxide chain length and small steric hindrance, it has the property of being able to be easily coordinated to the lithium ion. Probably for this reason, it exhibits the effect of reducing the strong interaction between the lithium ion and the matrix polymer skeleton.

A comparison of the electrolytes 3 and 21 to 24 of the invention and the comparative electrolytes 1 and 11 to 14 reveals that the use of $LiN(CF_3SO_2)_2$, $LiN(C_2F_5SO_2)_2$, $LiClO_4$, $LiBF_4$, $LiPF_6$, or the like as the lithium salt dissolved in the dry polymer electrolyte has the effect of improving lithium ion conductivity. The use of these lithium salts increases the ethylene glycol ether's effect of reducing the strong interaction between the lithium ion and the matrix polymer skeleton. Probably for this reason, lithium ion conductivity improves.

Example 5 and Comparative Example 4

Production of all Solid-State Polymer Primary Battery (1) Preparation of Negative Electrode Plate 11 and Polymer Electrolyte 13

A disc-like negative electrode plate 11 was prepared by pressing a lithium foil with a diameter of 10 mm and a thickness of 100 μm (available from Honjo Metal Co., negative electrode active material layer 23) to a copper foil with a diameter of 14 mm and a thickness of 20 μm (negative electrode current collector 22). The lithium foil and the copper foil had the center at the same position. Hence, the copper foil was exposed on the periphery of the lithium foil of the negative electrode plate 11.

A 30-μm thick polymer electrolyte 13, comprising each of the electrolytes 1 to 9, 11 to 20, 21 to 24 and comparative electrolytes 1 to 5 and 11 to 14, was formed on the lithium foil of the negative electrode plate 11. The polymer electrolyte 13 was formed so that it had the same shape and the same center position as the lithium foil. Thus, on the periphery of the face of the negative electrode plate 11 on which the polymer electrolyte 13 was formed, the polymer electrolyte 13 was not formed and the copper foil was exposed.

Specifically, the polymer electrolyte 13 was formed by the following procedure. First, the polymer electrolyte solution prepared in each of Examples 3 to 4 and Comparative Examples 2 to 4 was cast on the lithium foil of the negative electrode plate 11, and vacuum dried at 85° C. for 72 hours to completely remove the acetonitrile, so that a polymer electrolyte precursor was formed on the lithium foil. The polymer electrolyte precursor obtained was then impregnated with each of the ethylene glycol ethers used in Examples 3 to 5 and Comparative Examples 2 to 3, to prepare the polymer electrolyte 13.

(2) Preparation of Positive Electrode Plate 12

A positive electrode mixture paste was prepared by mixing electrolytic manganese dioxide subjected to a heat treatment of 400° C. ($MnO_2$, positive electrode active material), acetylene black (conductive agent), polyethylene oxide (viscosity-average molecular weight 100,000), $LiN(CF_3SO_3)_2$ (lithium salt), and acetonitrile, and kneading them. At this time, the $MnO_2$, acetylene black, polyethylene oxide, and $LiN(CF_3SO_2)_2$ were blended such that $MnO_2$:acetylene black:polymer electrolyte=70:20:10% by mass.

It should be noted that the polymer electrolyte refers to a composite of polyethylene oxide and $LiN(CF_3SO_3)_2$, and serves as a binder and a lithium-ion conductive electrolyte in the positive electrode active material layer. The polymer electrolyte was calculated based on the mass of the solid content.

The positive electrode mixture paste thus obtained was applied onto one face of a 20-μm thick aluminum foil (positive electrode current collector 23) and dried at 120° C. for 24 hours. This was rolled with a roll press to form a positive electrode active material layer 22 of 10 μm in thickness, so as to obtain an electrode film. The electrode film was cut to a 14-mm diameter disc, which was then subjected to a separation process such that the diameter of the positive electrode active material layer 22 was 10 mm, to prepare a positive electrode plate 12 in which the aluminum foil was exposed on the periphery thereof.

(3) Fabrication of all Solid-State Polymer Primary Battery

The negative electrode plate 11 and the positive electrode plate 12 obtained in the above manner were laminated so that the negative electrode active material layer 20 and the positive electrode active material layer 22 faced each other with the polymer electrolyte 13 therebetween, as illustrated in FIG. 1. Further, a seal material 14 shaped like a window flame and made of an insulating resin film was disposed between the periphery of the negative electrode plate 11 and the periphery of the positive electrode plate 12. The seal material 14 was then melted and bonded. In this way, flat all solid-state polymer primary batteries 1 of the invention and Comparative Example 4 were produced (batteries 31a to 39a and 41a to 54a and comparative batteries 11a to 15a and 21a to 24a).

(4) Evaluation of all Solid-State Polymer Primary Battery

A discharge test was performed at room temperature, a constant current of 10 μA, and an end-of-discharge voltage of 2.0 V, to measure the capacities of the all solid-state polymer primary batteries. Also, using an electrochemical measurement system (125WB type), the alternating-current impedances of the batteries were measured before and after the discharge test. As a result, the Nyquist plot in the frequency range of 0.01 Hz to 1 MHz showed an arc. On the assumption that the real axis intercept of this arc on the high frequency side is electrolyte resistance, and the real axis intercept on the low frequency side is the total of electrolyte resistance and interfacial resistance, interfacial resistance values were calculated from the values of these intercepts. Table 6 shows the results.

TABLE 6

| Battery | Dry polymer electrolyte | Interfacial resistance (Ω) Before discharge | Interfacial resistance (Ω) After discharge | Battery capacity (mAh) |
|---|---|---|---|---|
| Battery 31a | Invention electrolyte 1 | 190 | 580 | 0.86 |
| Battery 32a | Invention electrolyte 2 | 190 | 560 | 0.87 |
| Battery 33a | Invention electrolyte 3 | 170 | 550 | 0.88 |
| Battery 34a | Invention electrolyte 4 | 160 | 550 | 0.88 |
| Battery 35a | Invention electrolyte 5 | 160 | 550 | 0.88 |
| Battery 36a | Invention electrolyte 6 | 170 | 560 | 0.85 |
| Battery 37a | Invention electrolyte 7 | 170 | 560 | 0.87 |
| Battery 38a | Invention electrolyte 8 | 190 | 590 | 0.85 |
| Battery 39a | Invention electrolyte 9 | 190 | 600 | 0.85 |
| Battery 41a | Invention electrolyte 11 | 200 | 610 | 0.83 |
| Battery 42a | Invention electrolyte 12 | 210 | 600 | 0.83 |
| Battery 43a | Invention electrolyte 13 | 200 | 600 | 0.83 |
| Battery 44a | Invention electrolyte 14 | 350 | 790 | 0.67 |
| Battery 45a | Invention electrolyte 15 | 190 | 580 | 0.85 |
| Battery 46a | Invention electrolyte 16 | 190 | 590 | 0.84 |
| Battery 47a | Invention electrolyte 17 | 200 | 610 | 0.83 |
| Battery 48a | Invention electrolyte 18 | 200 | 620 | 0.84 |
| Battery 49a | Invention electrolyte 19 | 200 | 610 | 0.83 |
| Battery 50a | Invention electrolyte 20 | 260 | 660 | 0.77 |
| Battery 51a | Invention electrolyte 21 | 190 | 530 | 0.89 |
| Battery 52a | Invention electrolyte 22 | 200 | 590 | 0.83 |
| Battery 53a | Invention electrolyte 23 | 180 | 880 | 0.61 |
| Battery 54a | Invention electrolyte 24 | 180 | 870 | 0.63 |
| Comp. battery 11a | Comparative electrolyte 1 | 1100 | 8400 | 0.09 |
| Comp. battery 12a | Comparative electrolyte 2 | 1300 | 9000 | 0.08 |
| Comp. battery 13a | Comparative electrolyte 3 | 1200 | 8600 | 0.08 |
| Comp. battery 14a | Comparative electrolyte 4 | 1100 | 8400 | 0.09 |
| Comp. battery 15a | Comparative electrolyte 5 | 1300 | 9100 | 0.08 |
| Comp. battery 21a | Comparative electrolyte 11 | 1100 | 8400 | 0.09 |
| Comp. battery 22a | Comparative electrolyte 12 | 1300 | 9000 | 0.08 |
| Comp. battery 23a | Comparative electrolyte 13 | 1500 | 12000 | 0.03 |
| Comp. battery 24a | Comparative electrolyte 14 | 1100 | 11000 | 0.05 |

In Table 6, a comparison between the results of the batteries 31a to 39a and the results of the comparative batteries 11a to 15a shows that the use of a dry polymer electrolyte of the invention to form an all solid-state lithium primary battery can reduce the interfacial resistance of the all solid-state lithium primary battery, thereby heightening the capacity. In this case, it is particularly important that the dry polymer electrolyte of the invention contains an ethylene glycol ether having a mass decrease rate after 24-hour vacuum drying at room temperature of 3% or less. Such preferable results can be obtained probably because the inclusion of the ethylene glycol ether in the dry polymer electrolyte could improve lithium ion conductivity.

Also, the results of the batteries 33a and 36a to 39a indicate that the use of a dry polymer electrolyte of the invention can reduce the interfacial resistance of the all solid-state lithium primary battery, and heighten the capacity. In this case, it is particularly important that the dry polymer electrolyte of the invention is such that a lithium salt is positioned in a matrix polymer skeleton containing ether oxygen, that the ratio of the number of moles of the lithium salt to the number of moles of the ether oxygen is from 0.01 to 0.125, and that the ratio of the number of moles of an ethylene glycol ether to the number of moles of the lithium salt is from 0.05 to 3. Such preferable results can be obtained probably because the inclusion of the respective components in the dry polymer electrolyte in a specific ratio could further improve lithium ion conductivity.

Also, a comparison between the results of the batteries 33a and 41a to 50a and the result of the comparative battery 11a shows that the use of a dry polymer electrolyte of the invention can reduce the interfacial resistance of the all solid-state lithium primary battery, and heighten the capacity. In this case, it is particularly important that the dry polymer electrolyte of the invention contains at least one selected from the group consisting of methyl monoglyme, methyl diglyme, methyl triglyme, methyl tetraglyme, methyl pentaglyme, ethyl monoglyme, ethyl diglyme, ethyl triglyme, ethyl tetraglyme, and ethoxymethoxyethane as the ethylene glycol ether. It is understood that among them, the ethylene glycol ethers other than methyl pentaglyme are more preferable since they are more effective in improving lithium ion conductivity.

Also, a comparison between the result of the battery 50a and the result of the comparative battery 13a reveals that even when the ethylene glycol ether is a fluorine-containing ethylene glycol ether, the interfacial resistance value before and after the discharge test can be reduced and the capacity of the all solid-state lithium primary battery can be heightened. This is probably because even the use of the fluorine-containing ethylene glycol ether could improve the lithium ion conductivity of the dry polymer electrolyte.

Also, a comparison between the results of the batteries 23a and 51a to 54a and the results of the comparative batteries 11a and 21a to 24a indicates that the use of a dry polymer electrolyte of the invention can reduce the interfacial resistance value before and after the discharge test, thereby heightening the capacity of the all solid-state lithium primary battery. In this case, it is particularly important that the dry polymer electrolyte of the invention contains an ethylene glycol ether having a mass decrease rate of 24-hour vacuum drying at room temperature of 3% or less and contains at least one lithium salt selected from the group consisting of LiN$(CF_3SO_2)_2$, LiN$(C_2F_5SO_2)_2$, LiClO$_4$, LiBF$_4$ and LiPF$_6$. Such preferable results can be obtained probably because the combination of the ethylene glycol ether and the lithium salt could improve the lithium ion conductivity of the dry polymer electrolyte.

It has also been found that among the aforementioned lithium salts, the use of $LiN(CF_3SO_2)_2$, $LiN(C_2F_5SO_2)_2$, or $LiClO_4$ can further reduce the interfacial resistance value before and after the discharge test, thereby further heightening the capacity of the all solid-state lithium primary battery. Such preferable results can be obtained probably because these three lithium salts are chemically stable with respect to the lithium-based active material.

Example 6 and Comparative Example 5

Production of all Solid-State Polymer Secondary Battery (1) Preparation of Negative Electrode Plate 11 and Polymer Electrolyte 13

A negative electrode plate 11 and a polymer electrolyte 13 were prepared in the same manner as in Example 5 and Comparative Example 4.

(2) Preparation of Positive Electrode Plate 12

A positive electrode plate 12 was prepared in the same manner as in Example 5 and Comparative Example 4, except for the use of spinel-type lithium manganate ($LiMn_2O_4$, negative electrode active material) instead of electrolytic manganese dioxide.

(3) Production of all Solid-State Polymer Secondary Battery

Flat all solid-state polymer secondary batteries of the invention and Comparative Example 5 (batteries 31b to 39b and 41b to 54b and comparative batteries 11b to 15b and 21b to 24b) were produced in the same manner as in Example 5 and Comparative Example 4, except for the use of the negative electrode plate 11, the positive electrode plate 12, and the polymer electrolyte 13 obtained in the above manner.

(4) Evaluation of all Solid-State Polymer Secondary Battery

The all solid-state polymer secondary batteries were subjected to a 30 cycle charge/discharge test at room temperature, a constant current of 10 µA, an end-of-charge voltage of 3.5 V, and an end-of-discharge voltage of 2.0 V. Also, using an electrochemical measurement system (125WB type), the alternating-current impedances of the batteries were measured before and after the charge/discharge test. As a result, the Nyquist plot in the frequency range of 0.01 Hz to 1 MHz showed an arc.

On the assumption that the real axis intercept of this arc on the high frequency side is electrolyte resistance, and the real axis intercept on the low frequency side is the total of electrolyte resistance and interfacial resistance, interfacial resistance values were calculated from the values of these intercepts. Then, the battery interfacial resistance after 2 cycles and the interfacial resistance after 30 cycles were measured. Capacity retention rate was defined as the value obtained by dividing the discharge capacity at the $30^{th}$ cycle by the discharge capacity at the $2^{nd}$ cycle. Table 7 shows the results.

TABLE 7

| Battery | Dry polymer electrolyte | Interfacial resistance (Ω) After 2 cycles | Interfacial resistance (Ω) After 30 cycles | Capacity retention rate (%) |
| --- | --- | --- | --- | --- |
| Battery 31b | Invention electrolyte 1 | 640 | 840 | 85 |
| Battery 32b | Invention electrolyte 2 | 640 | 820 | 85 |
| Battery 33b | Invention electrolyte 3 | 620 | 810 | 87 |
| Battery 34b | Invention electrolyte 4 | 610 | 800 | 87 |
| Battery 35b | Invention electrolyte 5 | 610 | 800 | 87 |
| Battery 36b | Invention electrolyte 6 | 620 | 810 | 87 |
| Battery 37b | Invention electrolyte 7 | 630 | 830 | 86 |
| Battery 38b | Invention electrolyte 8 | 650 | 850 | 86 |
| Battery 39b | Invention electrolyte 9 | 650 | 850 | 86 |
| Battery 41b | Invention electrolyte 11 | 630 | 830 | 86 |
| Battery 42b | Invention electrolyte 12 | 620 | 830 | 87 |
| Battery 43b | Invention electrolyte 13 | 620 | 840 | 86 |
| Battery 44b | Invention electrolyte 14 | 770 | 940 | 72 |
| Battery 45b | Invention electrolyte 15 | 620 | 810 | 87 |
| Battery 46b | Invention electrolyte 16 | 630 | 830 | 86 |
| Battery 47b | Invention electrolyte 17 | 620 | 830 | 87 |
| Battery 48b | Invention electrolyte 18 | 620 | 840 | 86 |
| Battery 49b | Invention electrolyte 19 | 630 | 820 | 86 |
| Battery 50b | Invention electrolyte 20 | 680 | 860 | 80 |
| Battery 51b | Invention electrolyte 21 | 630 | 800 | 88 |
| Battery 52b | Invention electrolyte 22 | 650 | 840 | 84 |
| Battery 53b | Invention electrolyte 23 | 630 | 1080 | 68 |
| Battery 54b | Invention electrolyte 24 | 630 | 1010 | 69 |
| Comp. battery 11b | Comparative electrolyte 1 | 2300 | 8200 | 24 |
| Comp. battery 12b | Comparative electrolyte 2 | 2400 | 8300 | 23 |
| Comp. battery 13b | Comparative electrolyte 3 | 2400 | 8200 | 25 |
| Comp. battery 14b | Comparative electrolyte 4 | 2500 | 8300 | 27 |
| Comp. battery 15b | Comparative electrolyte 5 | 2600 | 8800 | 23 |
| Comp. battery 21b | Comparative electrolyte 11 | 2400 | 8300 | 23 |
| Comp. battery 22b | Comparative electrolyte 12 | 2400 | 8200 | 25 |
| Comp. battery 23b | Comparative electrolyte 13 | 2500 | 8300 | 27 |
| Comp. battery 24b | Comparative electrolyte 14 | 2600 | 8800 | 23 |

In Table 7, a comparison between the results of the batteries 31b to 39b and the results of the comparative batteries 11b to 15b shows that the use of a dry polymer electrolyte of the invention to form an all solid-state lithium secondary battery can reduce the interfacial resistance of the all solid-state lithium secondary battery, thereby improving cycle characteristics.

In this case, it is particularly important that the dry polymer electrolyte of the invention contains an ethylene glycol ether having a mass decrease rate after 24-hour vacuum drying at room temperature of 3% or less. Such preferable results can be obtained probably because the inclusion of the ethylene glycol ether in the dry polymer electrolyte could improve lithium ion conductivity.

Also, the results of the batteries 33b and 36b to 39b indicate that the use of a dry polymer electrolyte of the invention can reduce the interfacial resistance of the all solid-state lithium secondary battery, and improve cycle characteristics. In this case, it is particularly important that the dry polymer electrolyte of the invention is such that a lithium salt is positioned in a matrix polymer skeleton containing ether oxygen, that the ratio of the number of moles of the lithium salt to the number of moles of the ether oxygen is from 0.01 to 0.125, and that the ratio of the number of moles of an ethylene glycol ether to the number of moles of the lithium salt is from 0.05 to 3. Such preferable results can be obtained probably because the inclusion of the respective components in the dry polymer electrolyte in a specific ratio could further improve lithium ion conductivity.

Also, a comparison between the results of the batteries 33b and 41b to 50b and the result of the comparative battery 11b shows that the use of a dry polymer electrolyte of the invention can reduce the interfacial resistance of the all solid-state lithium secondary battery, and improve cycle characteristics. In this case, it is particularly important that the dry polymer electrolyte of the invention contains at least one selected from the group consisting of methyl monoglyme, methyl diglyme, methyl triglyme, methyl tetraglyme, methyl pentaglyme, ethyl monoglyme, ethyl diglyme, ethyl triglyme, ethyl tetraglyme, and ethoxymethoxyethane as the ethylene glycol ether. It is understood that among them, the ethylene glycol ethers other than methyl pentaglyme are more preferable since they are more effective in improving lithium ion conductivity.

Also, a comparison between the result of the battery 50b and the result of the comparative battery 13b reveals that even when the ethylene glycol ether is a fluorine-containing ethylene glycol ether, the interfacial resistance value before and after the discharge test can be reduced and the cycle characteristics of the all solid-state lithium secondary battery can be improved. This is probably because even the use of the fluorine-containing ethylene glycol ether could improve the lithium ion conductivity of the dry polymer electrolyte.

Also, a comparison between the results of the batteries 33b and 51b to 54b and the results of the comparative batteries 11b and 21b to 24b indicates that the use of a dry polymer electrolyte of the invention can reduce the interfacial resistance value before and after the discharge test, thereby improving the cycle characteristics of the all solid-state lithium secondary battery.

In this case, it is particularly important that the dry polymer electrolyte of the invention contains an ethylene glycol ether having a mass decrease rate of 24-hour vacuum drying at room temperature of 3% or less and contains at least one lithium salt selected from the group consisting of LiN($CF_3SO_2$)$_2$, LiN($C_2F_5SO_2$)$_2$, LiClO$_4$, LiBF$_4$ and LiPF$_6$. Such preferable results can be obtained probably because the combination of the ethylene glycol ether and the lithium salt could improve the lithium ion conductivity of the dry polymer electrolyte.

It has also been found that among the aforementioned lithium salts, the use of LiN($CF_3SO_2$)$_2$, LiN($C_2F_5SO_2$)$_2$, or LiClO$_4$ can further reduce the interfacial resistance value before and after the discharge test, thereby further improving the cycle characteristics of the all solid-state lithium secondary battery. Such preferable results can be obtained probably because these three lithium salts are chemically stable with respect to the lithium-based active material.

Example 7

Figure 4:
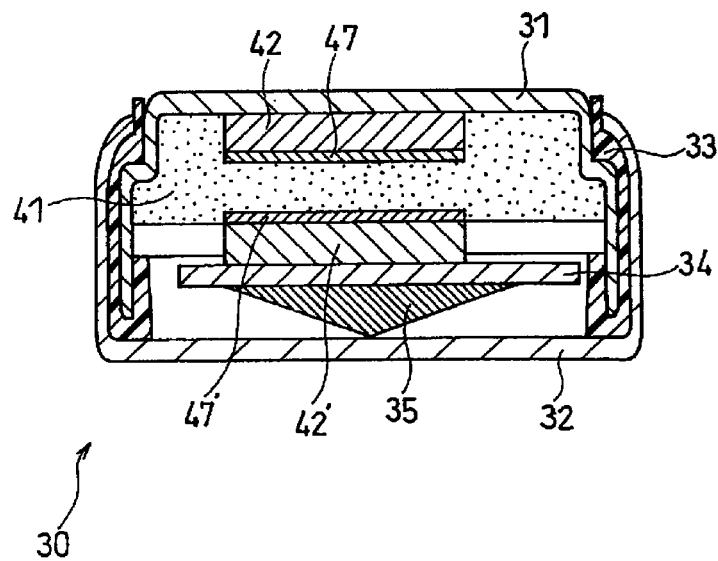
FIG. 4 is a longitudinal sectional view schematically showing the constitution of a lithium symmetric cell of Example 7.

An evaluation cell (symmetric cell in which both electrodes are lithium electrodes) 30 as illustrated in FIG. 4 was produced as follows. This evaluation cell 30 is hereinafter referred to as the lithium symmetric cell 30. The production of the lithium symmetric cell 30 was carried out in a glove box whose atmosphere consisted of 3.5% by volume of nitrogen and 96.5% by volume of argon.

An acetonitrile solution of polyethylene oxide was prepared by dissolving 10 g of polyethylene oxide with a viscosity-average molecular weight of 100,000 (available from Sigma-Aldrich Corporation) and 10 g of dimethoxyethane (DME) in 100 g of acetonitrile. This acetonitrile solution was mixed with LiN($CF_3SO_2$)$_2$ such that the molar ratio [Li]/[EO] of the lithium ion concentration [Li] to the ether oxygen concentration [EO] in the ethylene oxide moiety in the polymer was 0.05, so as to obtain an acetonitrile solution of dry polymer electrolyte.

The acetonitrile solution of dry polymer electrolyte obtained was cast onto a stainless steel seal plate 31 to which a lithium foil 42 (diameter 10 mm, thickness 0.3 mm) had been pressed. It was then vacuum dried at room temperature for 48 hours to remove the solvent components, i.e., acetonitrile and DME, thereby forming a electrolyte layer 41 comprising a dry polymer electrolyte.

The dry polymer electrolyte obtained was subjected to a thermal extraction GC-MS analysis. As a result, the glyme solvent (DME) was detected from the dry polymer electrolyte. A very small amount of DME is preferable in that DME and the lithium ion form a complex in the dry polymer electrolyte, thereby increasing the conductivity of the dry polymer electrolyte and improving the high-rate discharge characteristics of the battery after storage.

Another lithium foil 42'(diameter 10 mm, thickness 0.3 mm) was pressed onto the electrolyte layer 41 to form an electrode assembly on the seal plate 31. Also, a disc spring 35 and a spacer 34 were mounted on the inner bottom face of a stainless case 32. The disc spring 35 and the spacer 34 serve to accommodate variations in the thickness of the lithium foils (electrodes) and close the gap between the electrode assembly and the case 32. Thereafter, the open edge of the case 32 was crimped onto the circumference of the seal plate 31 with a gasket 33 therebetween, to seal the electrode assembly in the case. In this way, using the lithium electrodes, the lithium symmetric cell 30 was produced.

Figure 5:
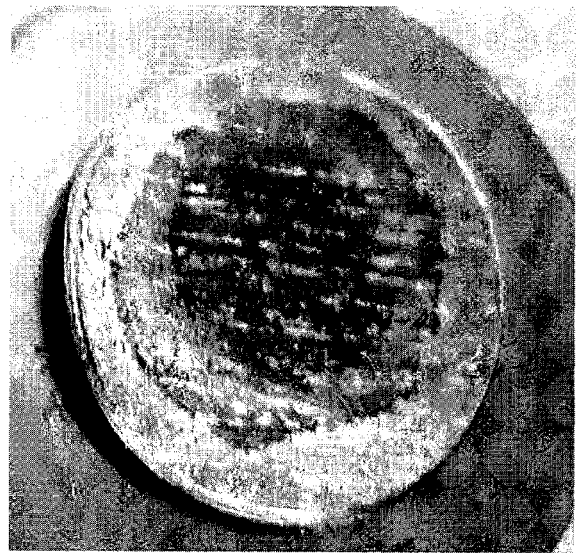
FIG. 5 is a photo of the lithium foil surface in the lithium symmetric cell of Example 7.

The lithium symmetric cell 30 was subjected to aging in a 60° C. thermostatic oven for 3 days, and the lithium symmetric cell 30 was then disassembled. The lithium foils were taken out, and the contact face of each lithium foil with the dry polymer electrolyte was observed. FIG. 5 shows the observation results. As shown in FIG. 5, the lithium surface was found to have brown discoloration. Since such discoloration was not found before the fabrication of the lithium symmetric cell, the discoloration was analyzed by XRD (X-ray diffraction) and XPS (X-ray Photoelectron Spectroscopy).

For XRD analysis, an X-ray photoelectron spectroscopic analyzer (trade name: automatic multi-purpose X ray diffractometer X'Pert PROX, available from Spectris Co., Ltd.) was used. The measurement conditions were set as follows. Voltage: 45 kV, current: 40 mA, scan mode: continuous, scan range: 7 to 90° C., step width: 0.02° C., scan speed: 100 s/step, slit width (DS/SS/RS): 0.5°/0.5°/0.1 mm, and atmosphere: helium.

For XPS analysis, an X-ray photoelectron spectroscopic analyzer (trade name: XPS-7000, available from Rigaku Corporation) was used. The measurement conditions were set as follows. X-ray source: Mg—K$\alpha$, voltage: 10 kV, current: 10 mA, X ray spot size: approximately 9 mm, and degree of vacuum: $10^{-7}$ Pa. Charge correction was made based on the is electron binding energy of hydrocarbon or the 2 p electron binding energy of argon used for ion etching (ion etching up to 5000 nm, acceleration voltage: 500 V, angle: 90 degrees, ion current density: 32 μA/cm$^2$, and etching rate: 1 nm/min).

Figure 6:
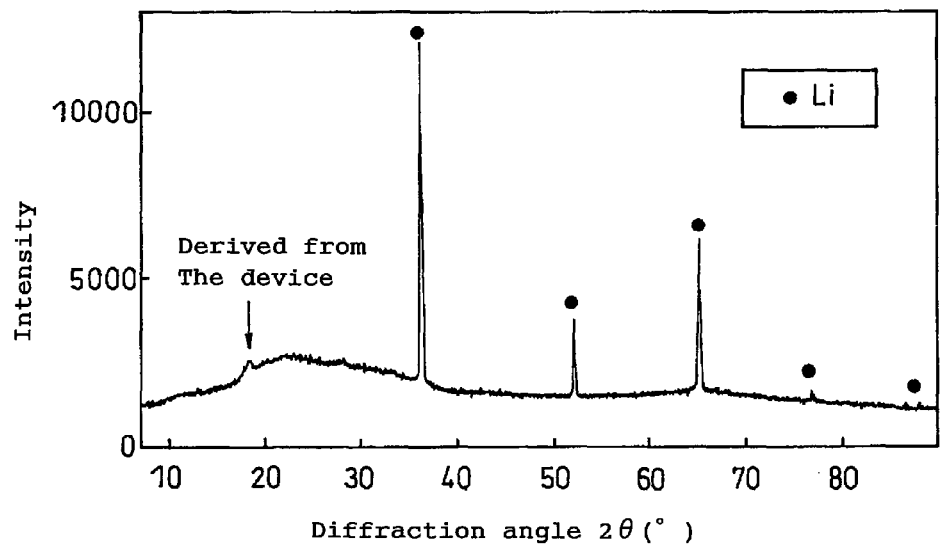
FIG. 6 is an XRD chart of the lithium foil surface in the lithium symmetric cell of Example 7.
Figure 7:
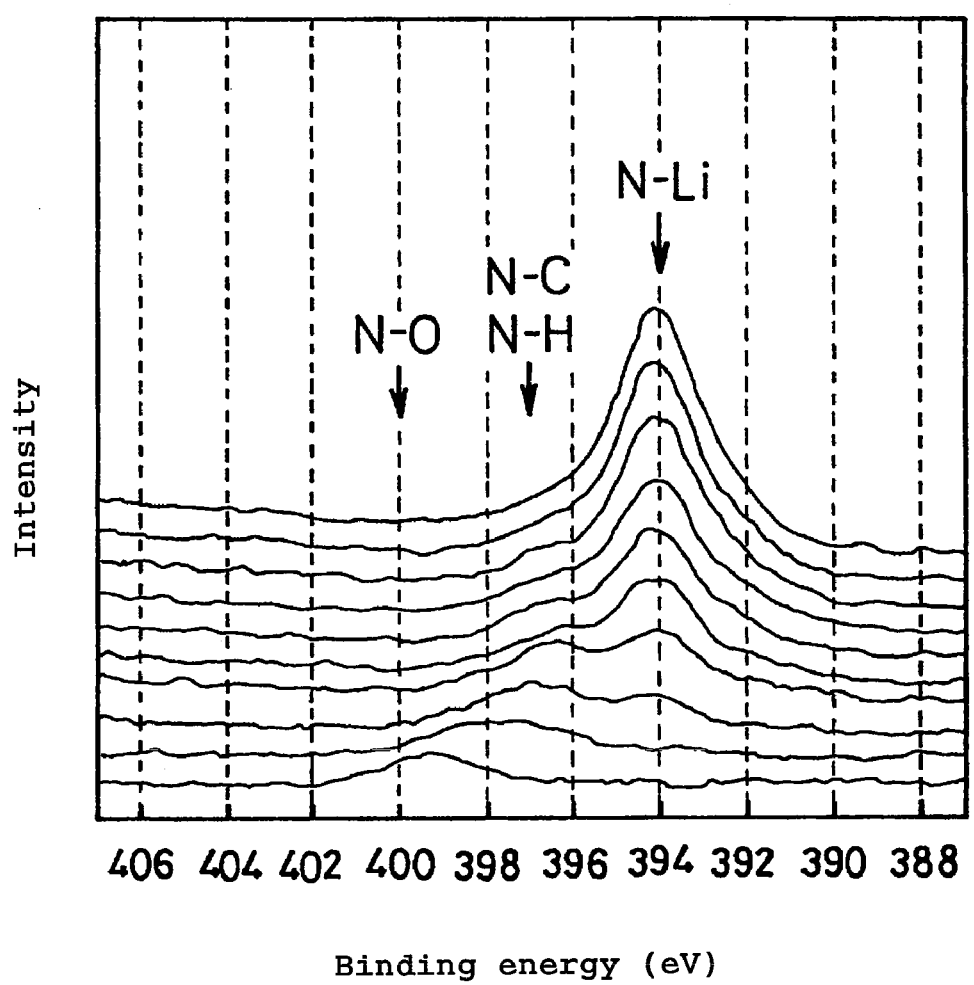
FIG. 7 is an XPS chart of the lithium foil surface in the lithium symmetric cell of Example 7.

FIG. 6 shows the results of the XRD analysis. As shown in FIG. 6, although diffraction peaks derived from Li were found, other diffraction peaks were not found. Also, FIG. 7 shows the 1 s spectra of N obtained by XPS. The spectra from below upward in FIG. 7 represent depth 0 (outermost surface), 2, 5, 10, 20, 50, 100, 200, 300, and 500 nm, respectively. As shown in FIG. 7, peaks based on the N—Li bond were found, and the 1 s spectra of N were found to have a maximum peak only from 393.5 to 394.5 eV in the binding energy range of 390.0 to 396.0 eV.

The above results have showed that the brown discoloration at the negative electrode interface was made of an amorphous lithium nitride. That is, they have confirmed that amorphous lithium nitride layers 47 and 47' were formed between the lithium foil 42 and the dry polymer electrolyte layer 41 and between the lithium foil 42' and the dry polymer electrolyte 41, respectively.

For comparison, a crystalline reagent powder of $Li_3N$ was subjected to an XPS analysis, and the result showed that unlike the above amorphous lithium nitride, the crystalline lithium nitride exhibited maximum peaks from 393.5 to 394 eV and from 391.5 to 392.5 eV in the binding energy range of 390.0 to 396.0 eV.

Example 8

In this example, lithium symmetric cells were produced in the same manner as in Example 7, except that the nitrogen content in the atmosphere was varied between 0.1 and 10% by volume by changing the volume ratio between nitrogen and argon.

Then, observation of lithium surface before fabrication, observation of lithium surface after aging, XRD analysis, and XPS analysis were carried out in the same manner as in Example 7. Table 8 shows the results.

Then, observation of lithium surface before fabrication, observation of lithium surface after aging, XRD analysis, and XPS analysis were carried out in the same manner as in Example 1. Table 8 shows the results.

TABLE 8

| Nitrogen content (% by volume) | Lithium surface Before fabrication | After aging | XDR measurement result | XPS analysis result (1s spectra of N: 390.0 to 396.0 eV) |
|---|---|---|---|---|
| 0.1 | Metallic luster | Brown | Only Li peaks | Maximum peak present only from 393.5 to 394.5 eV |
| 0.5 | Metallic luster | Brown | Only Li peaks | |
| 1.0 | Metallic luster | Brown | Only Li peaks | |
| 3.5 | Metallic luster | Brown | Only Li peaks | |
| 10 | Metallic luster | Brown | Only Li peaks | |

As shown in Table 8, the same results as those of Example 7 were obtained, and the negative electrode interface after aging was found to have the amorphous lithium nitride layer.

Comparative Example 6

Lithium symmetric cells were produced in the same manner as in Example 7, except that the nitrogen content in the atmosphere was varied between 0 and 0.08% by volume. Then, observation of lithium surface before fabrication, observation of lithium surface after aging, XRD analysis, and XPS analysis were carried out in the same manner as in Example 7. Table 9 shows the results.

TABLE 9

| Nitrogen content (% by volume) | Lithium surface Before fabrication | After aging | XDR measurement result | XPS analysis result (1s spectra of N: 390.0 to 396.0 eV) |
|---|---|---|---|---|
| 0 | Metallic luster | No discoloration | Only Li peaks | No maximum peak |
| 0.01 | Metallic luster | No discoloration | Only Li peaks | No maximum peak |
| 0.05 | Metallic luster | No discoloration | Only Li peaks | No maximum peak |
| 0.08 | Metallic luster | No discoloration | Only Li peaks | No maximum peak |

After the aging, the lithium symmetric cells were disassembled, the lithium foils were taken out, and the contact face with the dry polymer electrolyte was observed. As a result, the lithium foil surface was found to have no discoloration. The lithium surface was subjected to an XRD analysis and an XPS analysis. The XRD result showed diffraction peaks derived from Li, but did not show any other diffraction peak.

Figure 8:
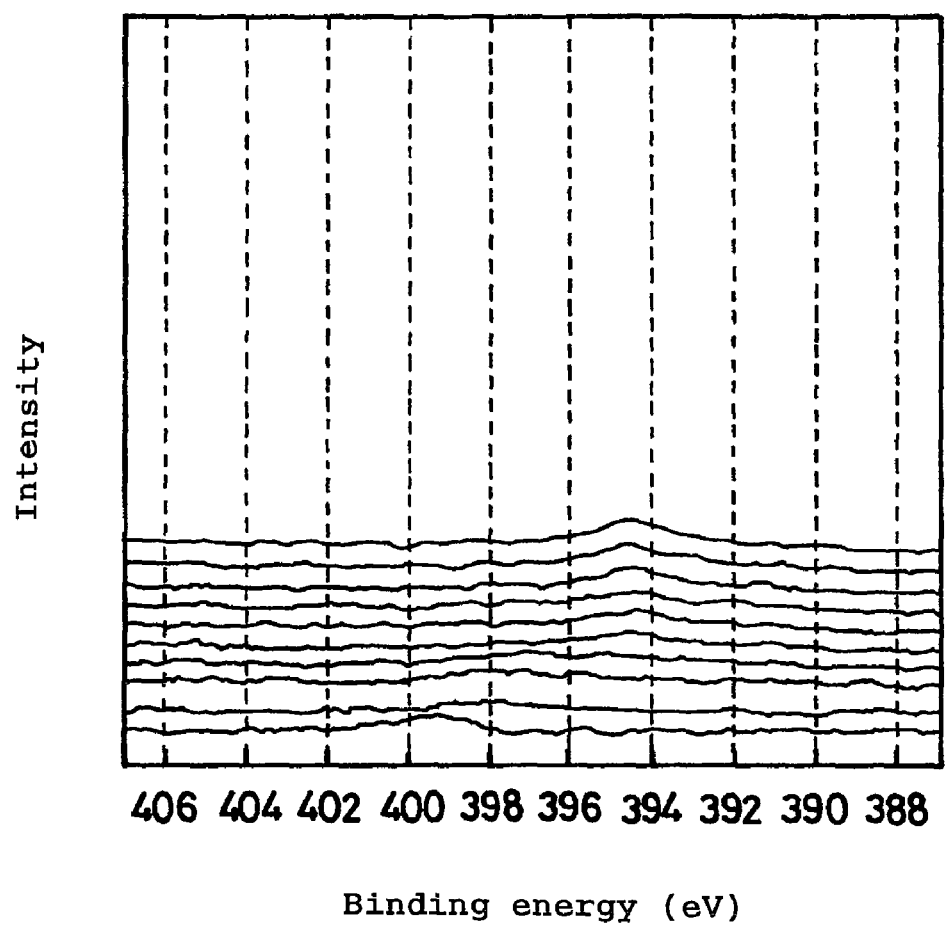
FIG. 8 is an XPS chart of the lithium foil surface in a lithium symmetric cell of Comparative Example 6.

Also, the lithium surface for the nitrogen content of 0% was subjected to an XPS, and the 1 s spectra of N were found to have no peak, as shown in FIG. 8.

The spectra from below upward in FIG. 8 represent depth 0 (outermost surface), 2, 5, 10, 20, 50, 100, 200, 300, and 500 nm, respectively. In this way, in the atmosphere with a nitrogen content of 0 to 0.08% by volume, no lithium nitride layer was formed at the negative electrode interface.

Comparative Example 7

Lithium symmetric cells were produced in the same manner as in Example 7, except that the nitrogen content in the atmosphere was varied between 15 and 100% by volume. Then, observation of lithium surface before fabrication, observation of lithium surface after aging, XRD analysis, and XPS analysis were carried out in the same manner as in Example 7. Table 10 shows the results.

TABLE 10

| Nitrogen content (% by volume) | Lithium surface Before fabrication | After aging | XDR measurement result | XPS analysis result (1s spectra of N: 390.0 to 396.0 eV) |
|---|---|---|---|---|
| 15 | Brown | Brown | Peaks of Li and $Li_3N$ | Maximum peaks from 391.5 to 392.5 eV and from 393.5 to 394.5 eV |
| 30 | Brown | Brown | Peaks of Li and $Li_3N$ | |
| 70 | Brown | Brown | Peaks of Li and $Li_3N$ | |
| 100 | Brown | Brown | Peaks of Li and $Li_3N$ | |

Figure 9:
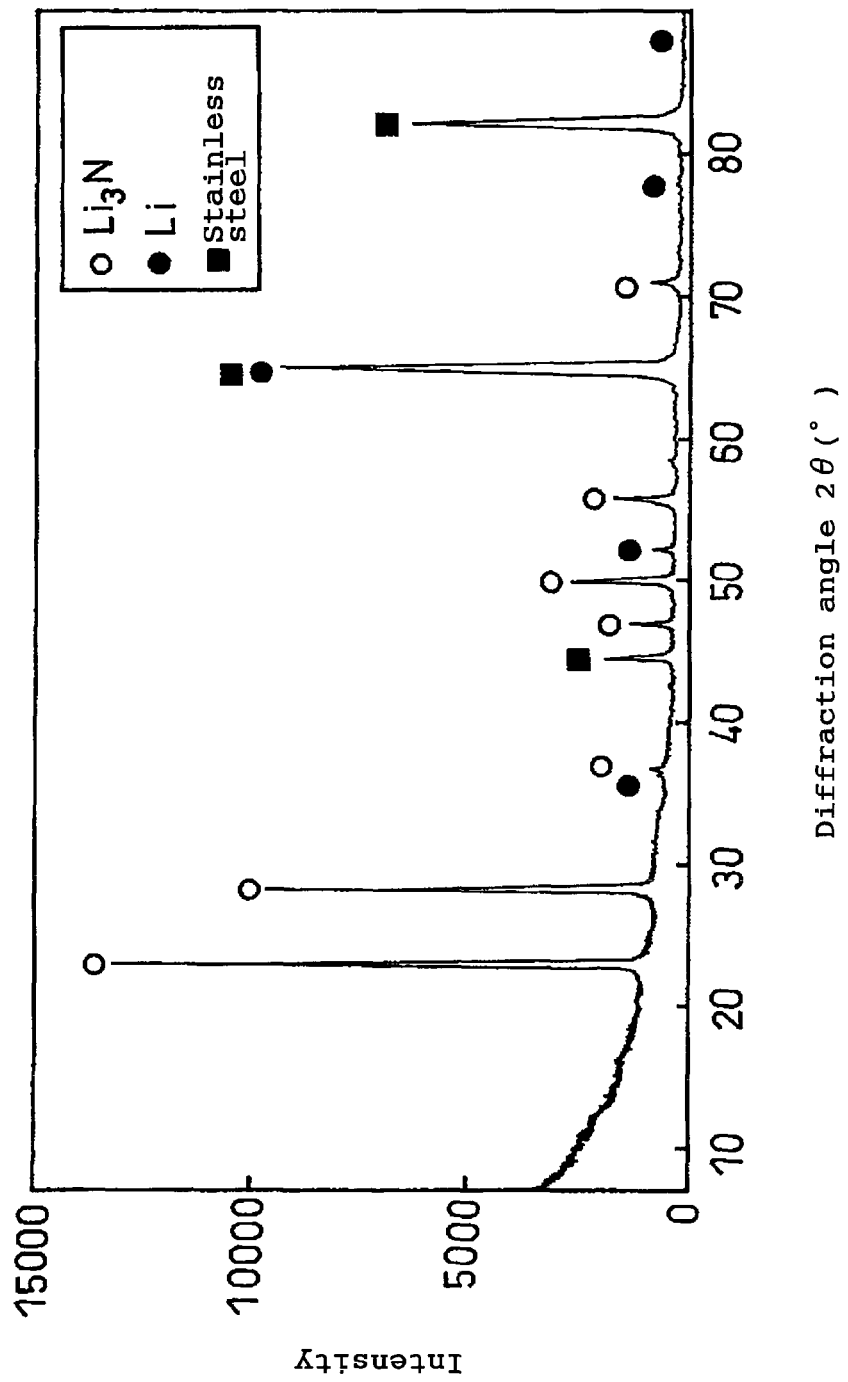
FIG. 9 is an XRD chart of the lithium foil surface in a lithium symmetric cell of Comparative Example 7.

When the nitrogen content in the atmosphere was 15% by volume or more, the lithium surface was found to have brown discoloration before cell fabrication. The discoloration was subjected to an XRD analysis, and the result showed crystal diffraction peaks derived from $Li_3N$. This has shown that when the nitrogen content in the atmosphere is 15% by volume or more, crystal $Li_3N$ is formed. Also, FIG. 9 shows the result of XRD analysis of the discoloration which was found in the lithium symmetric cell produced in the pure nitrogen atmosphere of nitrogen content 100% by volume.

Figure 10:
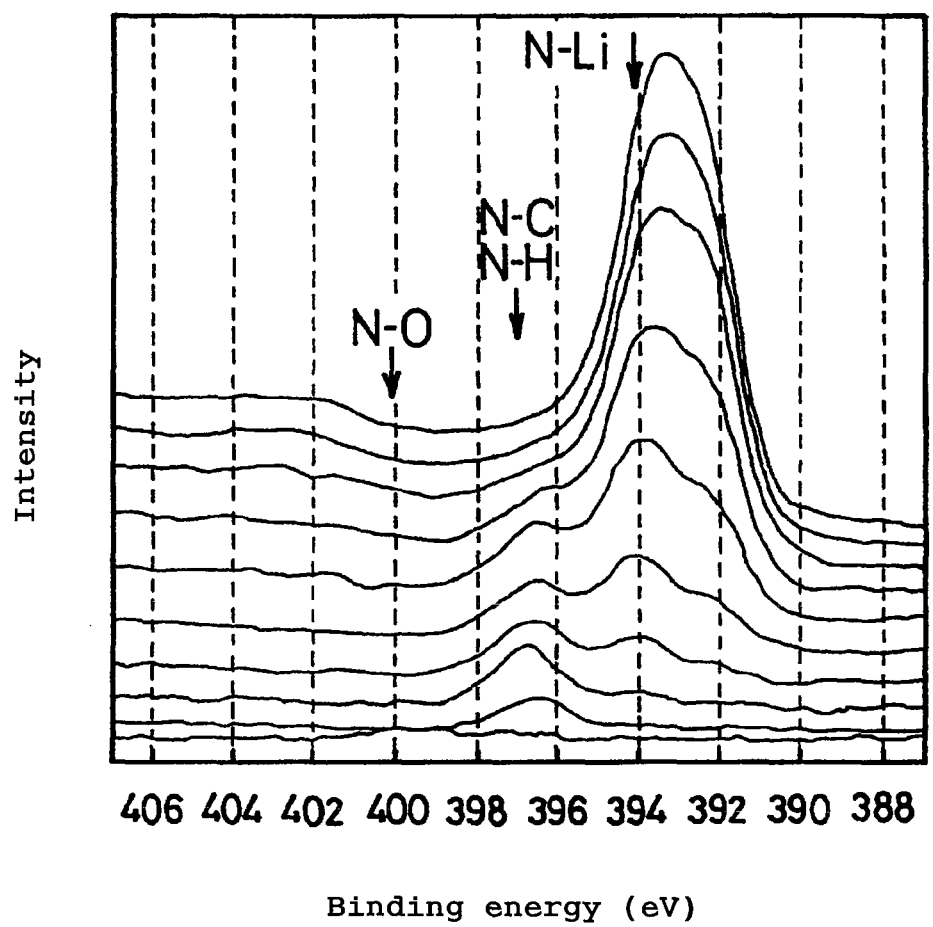
FIG. 10 is an XPS chart of the lithium foil surface in the lithium symmetric cell of Comparative Example 7.

Also, the discoloration was subjected to an XPS analysis, and the result showed that the 1 s spectra of N have maximum peaks from 393.5 to 394 eV and from 391.5 to 392.5 eV in the binding energy range of 390 to 396 eV, as in the XPS analysis result of the crystalline reagent powder of $Li_3N$. Also, FIG. 10 shows the result of XPS analysis of the discoloration which was found in the lithium symmetric cell produced in the pure nitrogen atmosphere of nitrogen content 100% by volume. The spectra from below upward in FIG. 10 represent depth 0 (outermost surface), 2, 5, 10, 20, 50, 100, 200, 300, and 500 nm, respectively.

After the aging, the lithium symmetric cells were disassembled, the lithium foils were taken out, and the contact face with the electrolyte layer was observed. The results were the same as those for the analysis of the lithium foils before fabrication. This has confirmed that when the nitrogen content in the atmosphere is 15 to 100% by volume, a crystalline $Li_3N$ layer is formed at the negative electrode interface.

The results of Examples 7 and 8 and Comparative Examples 6 and 7 have showed that when the nitrogen content in the atmosphere is 0.1 to 10% by volume, an amorphous lithium nitride with a small resistance is formed. They have indicated that when the nitrogen content in the atmosphere exceeds 10% by volume, a crystalline lithium nitride is formed at the negative electrode interface, and that when the nitrogen content in the atmosphere is less than 0.1% by volume, a lithium nitride layer is unlikely to be formed at the negative electrode interface.

In Examples 7 and 8, the lithium nitride layer was formed on the lithium foil surface after the aging, and this is probably for the following two reasons. One reason for such formation is that when the electrolyte layer was prepared in the nitrogen-containing atmosphere, nitrogen dissolved into the electrolyte layer, and the nitrogen in the electrolyte layer reacted with the lithium-based active material in contact with the electrolyte layer. Another reason for such formation is the direct reaction between the nitrogen in the atmosphere and the lithium-based active material.

Example 9

In a pure nitrogen atmosphere, the same dry polymer electrolyte solution as that used in Example 7 was cast on a polyethylene terephthalate film serving as a substrate, and the solvent was vacuum dried at room temperature for 48 hours to remove the solvent components, i.e., acetonitrile and DME. In this way, an electrolyte layer of dry polymer electrolyte was formed. The formed electrolyte layer was then moved into a pure argon atmosphere, where a lithium symmetric cell was fabricated in the same manner as in Example 7.

After the lithium symmetric cell was subjected to aging in a 60° C. thermostatic oven for 3 days, the lithium symmetric cell was disassembled and the lithium foils were taken out. When the contact face with the electrolyte layer was observed, it was found to have brown discoloration. Such discoloration was not found before the fabrication of the lithium symmetric cell.

Also, the discoloration was subjected to an XRD analysis and an XPS analysis. The results were the same as those in Example 7, which indicated that an amorphous lithium nitride layer was formed at the negative electrode interface.

The reason for the formation of the lithium nitride layer on the lithium foil surface after the aging was probably that when the electrolyte layer was prepared in the pure nitrogen atmosphere, nitrogen dissolved into the electrolyte layer, and the nitrogen reacted with the lithium-based active material in contact with the electrolyte layer.

Using an electrochemical measurement system (trade name: 1255WB type, available from Solartron Metrology), each lithium symmetric cell obtained in the above manner was subjected to an alternating-current impedance measurement. As a result of the measurement, the Nyquist plot in the frequency range of 0.01 Hz to 1 MHz showed an arc. On the assumption that the real axis intercept of this arc on the high frequency side is electrolyte resistance, and the real axis intercept on the low frequency side is the total of electrolyte resistance and interfacial resistance, interfacial resistance values were calculated from the values of these intercepts.

Figure 11:
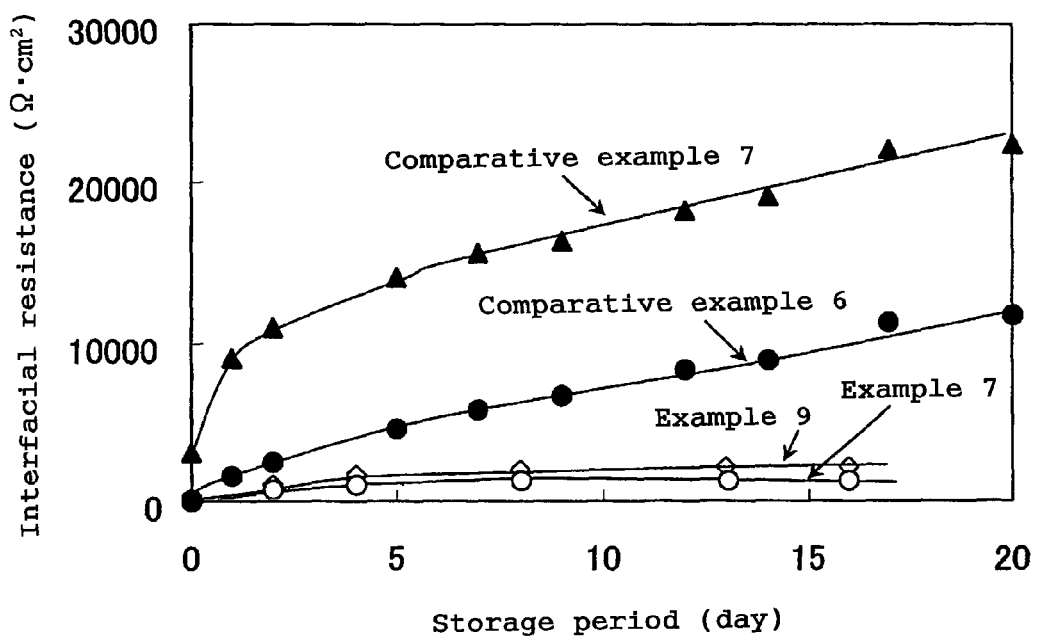
FIG. 11 is a graph showing the relation between the storage period at 60° C. and the resistance at the negative electrode interface in lithium symmetric cells of Examples 7 and 9 and Comparative Examples 6 and 7.

The lithium symmetric cells of Examples 7 and 9 (nitrogen content 3.5% by volume) and Comparative Examples 6 and 7 (nitrogen content 100% by volume) before the aging were stored at 60° C., and a change in interfacial resistance at 30° C. with time was measured. FIG. 11 shows these measurement results.

In the lithium symmetric cells of Examples 7 and 9, the interfacial resistance increased slightly at first, but the increase in interfacial resistance soon stopped and stable values were obtained. This is probably because an amorphous lithium nitride layer was formed at the negative electrode interface, and this layer functioned as a protective film suppressing the decomposition of the dry polymer electrolyte.

On the other hand, in the lithium symmetric cells of Comparative Examples 6 and 7, the interfacial resistance increased significantly. The reason for the increased interfacial resistance of the lithium symmetric cell of Comparative Example 6 is probably that the lithium nitride layer serving as the protective film was insufficient, and thus an insulating coating film was formed at the negative electrode interface. Also, the reason for the increased interfacial resistance of the lithium symmetric cell of Comparative Example 7 is probably that the lithium nitride layer was crystalline, which made the lithium ion movement at the negative electrode interface difficult and the adhesion at the negative electrode interface insufficient.

The lithium symmetric cell of Example 7 had a lower interfacial resistance than the lithium symmetric cell of Example 9. In Example 7, since the lithium was handled in the nitrogen-containing atmosphere, it is thought that an undetectable level of a lithium nitride was formed on the lithium foil surface before the fabrication. It is thought that this layer suppressed contact between the electrolyte layer and the lithium foil during the fabrication of the lithium symmetric cell, thereby reducing the interfacial resistance.

Example 10

The same flat all solid-state polymer battery as that of FIG. 3 was produced in the following procedure. In this example, the preparation of an electrolyte layer and the fabrication of an all solid-state polymer battery using the electrolyte layer were carried out in a glove box whose atmosphere consisted of 3.5% by volume of nitrogen and 96.5% by volume of argon.

(1) Formation of Polymer Electrolyte on Negative Electrode Surface

A negative electrode active material layer 20 made of a lithium foil (diameter 10 mm, thickness 100 μm) was pressed to a negative electrode current collector 21 made of a copper foil (diameter 14 mm, thickness 10 μm) to obtain a disc-like negative electrode 11. At this time, the lithium foil and the copper foil were disposed so that they had the center at the same position. Thus, the negative electrode current collector 21 was exposed on the periphery of the negative electrode active material layer 20 of the negative electrode 11.

The same dry polymer electrolyte solution as that used in Example 7 was cast on the negative electrode active material layer 20 of the negative electrode 11. It was then vacuum dried at room temperature for 48 hours to remove the solvent components, i.e., acetonitrile and DME, thereby forming a polymer electrolyte 13 on the negative electrode active material layer 20 of the negative electrode 11. In this way, the polymer electrolyte 13 was formed on the surface of the negative electrode 11. At this time, the thickness of the polymer electrolyte 13 was 100 μm. Also, the negative electrode active material layer 20 and the polymer electrolyte 13 had the center at the same position and had the same diameter. Hence, on the periphery of the face of the negative electrode 11 on which the polymer electrolyte 13 was formed, the polymer electrolyte 13 was not formed, and the negative electrode current collector 21 was exposed.

(2) Preparation of Positive Electrode 12

A positive electrode mixture paste was prepared by adding acetonitrile, DME, and NMP to electrolytic manganese dioxide subjected to a heat treatment of 400° C. as a positive electrode active material, acetylene black as a conductive agent, polyethylene oxide (dry polymer electrolyte) with a viscosity-average molecular weight of 100,000 as a binder, and $LiN(CF_3SO_2)_2$ as a Li salt, and mixing them. At this time, the weight ratio of electrolytic manganese dioxide:acetylene black:dry polymer electrolyte was 70:20:10. The dry polymer electrolyte was calculated based on the mass of the solid content.

The positive electrode mixture paste prepared was applied onto one face of a positive electrode current collector 23 made of an aluminum foil (thickness 15 μm) and dried at 85° C. for 48 hours. This was rolled to form a positive electrode active material layer 22 on the positive electrode current collector 23, to obtain an electrode film. The electrode film was cut to a 14-mm diameter disc, which was then subjected to a separation process such that the diameter of the positive electrode active material layer 22 was 10 mm, to obtain a positive electrode 12 in which the positive electrode current collector 23 was exposed on the periphery of the positive electrode active material layer 22. At this time, the thickness of the positive electrode active material layer 22 was 20 μm.

(3) Fabrication of all Solid-State Polymer Battery

Then, the negative electrode 11 with the dry polymer electrolyte 13 formed thereon and the positive electrode 12 prepared in the above manner were laminated so that the negative electrode active material layer 20 and the positive electrode active material layer 22 faced each other with the polymer electrolyte 13 therebetween, to obtain an electrode assembly. Further, a seal material 14 shaped like a window flame and made of an insulating resin film was fitted around the electrode assembly (between the periphery of the positive electrode current collector 23 and the periphery of the negative electrode current collector 21). The seal material 14 was melted and bonded to seal the electrode assembly, which was then subjected to aging in a 60° C. thermostatic oven for 3 days. In this way, the flat all solid-state polymer battery as illustrated in FIG. 3 was produced.

The all solid-state polymer battery was disassembled, the lithium foil (negative electrode layer) was taken out, and the contact face with the electrolyte layer was observed. As a result, the lithium foil surface was found to have brown discoloration. The result of Example 7 suggests that this discoloration is a lithium nitride layer. Such discoloration was not found when the all solid-state polymer battery was fabricated.

Next, the battery was stored at 60° C. for 30 days and then discharged at an ambient temperature of 30° C., a current density of 25 μA/cm², and a cut-off voltage of 1.8 V, to measure battery capacity. As a result, the discharge capacity per gram of positive electrode active material was 255 mAh/g. On the assumption that the theoretical reaction of manganese dioxide is a one-electron reaction, the theoretical capacity is 308 mAh/g. This indicates that in the above discharge test, a battery capacity of 80% or more of the theoretical capacity of the positive electrode active material was obtained.

Example 11

All solid-state polymer batteries were produced in the same manner as in Example 10, except that the nitrogen content in the atmosphere was varied between 0.1 to 10% in the preparation of the electrolyte layer and the fabrication of the all solid-state polymer battery.

A storage test was conducted by storing the batteries at 60° C. for 30 days, disassembling the batteries, and observing the contact face of the lithium foil with the dry polymer electrolyte layer. Also, a discharge test was conducted by storing the batteries at 60° C. for 30 days, discharging them at an ambient temperature of 30° C., a current density of 25 μA/cm², and a cut-off voltage of 1.8 V, and measuring the battery capacity. Table 11 shows the results.

TABLE 11

| Nitrogen content | Lithium surface | | Discharge capacity |
|---|---|---|---|
| (% by volume) | Before fabrication | After storage test | (mAh/g) |
| 0.1 | Metallic luster | Brown | 255 |
| 0.5 | Metallic luster | Brown | 256 |
| 1.0 | Metallic luster | Brown | 257 |
| 3.5 | Metallic luster | Brown | 255 |
| 10 | Metallic luster | Brown | 256 |

In any of the production conditions, the discharge capacity was approximately 255 mA/g, and a battery of 80% or more of the theoretical capacity could be obtained.

Comparative Example 8

All solid-state polymer batteries were produced in the same manner as in Example 10, except that the nitrogen content in the atmosphere was varied between 0 and 0.08% by volume in the preparation of the electrolyte layer and the fabrication of the all solid-state polymer battery.

After these all solid-state polymer batteries were subjected to aging at 60° C. for 3 days, they were disassembled, and the lithium foils were taken out. When the contact face with the electrolyte layer was observed, no discoloration was found on the lithium foil surface. Also, under the same conditions as those in Example 11, a storage test and a discharge test were performed. Table 12 shows the results.

TABLE 12

| Nitrogen content | Lithium surface | | Discharge capacity |
|---|---|---|---|
| (% by volume) | Before fabrication | After storage test | (mAh/g) |
| 0 | Metallic luster | Brown | 141 |
| 0.01 | Metallic luster | Brown | 147 |

TABLE 12-continued

| Nitrogen content (% by volume) | Lithium surface | | Discharge capacity (mAh/g) |
|---|---|---|---|
| | Before fabrication | After storage test | |
| 0.05 | Metallic luster | Brown | 146 |
| 0.08 | Metallic luster | Brown | 149 |

Table 12 shows that in any of the production conditions, the battery discharge capacity is approximately 150 mAh/g, which is 50% or less of the theoretical capacity. This is probably because the absence of a lithium nitride layer serving as a protective film at the negative electrode interface resulted in the formation of an insulating coating film at the negative electrode interface during the storage test, thereby increasing the interfacial resistance.

Comparative Example 9

An all solid-state polymer battery was produced in the same manner as in Example 10, except that the preparation of the electrolyte layer and the fabrication of the all solid-state polymer battery were performed in a pure nitrogen atmosphere with a nitrogen content of 100% by volume. At this time, the lithium foil surface before the fabrication was found to have brown discoloration.

After this all solid-state polymer battery was subjected to aging at 60° C. for 3 days, it was disassembled, and the lithium foil was taken out. When the contact face with the electrolyte layer was observed, the lithium foil surface was found to have discoloration.

Next, under the same conditions as those in Example 11, a storage test and a discharge test were conducted. As a result, the battery discharge capacity was approximately 100 mAh/g, which was 35% or less of the theoretical capacity. This is probably because the presence of a crystalline lithium nitride layer at the negative electrode interface makes the lithium movement at the negative electrode interface difficult and the adhesion at the negative electrode interface insufficient, thereby lowering the discharge capacity.

Example 12

An all solid-state polymer battery was produced under the same conditions as those in Example 10, except that the formation of the polymer electrolyte on the negative electrode surface was performed in a pure nitrogen atmosphere, and that the preparation of the positive electrode and the fabrication of the all solid-state battery (electrode assembly preparation step and sealing step) were performed in a pure argon atmosphere.

After this all solid-state polymer battery was subjected to aging at 60° C. for 3 days, it was disassembled, and the lithium foil was taken out. When the contact face with the electrolyte layer was observed, the lithium foil surface was found to have discoloration. Also, a discharge test was conducted under the same conditions as those in Example 11. As a result, the battery discharge capacity was 247 mAh/g, which was 80% or more of the theoretical capacity.

INDUSTRIAL APPLICABILITY

The present invention can reduce the resistance at the interface between the negative electrode active material and the polymer electrolyte, thereby providing an all solid-state polymer battery having high battery capacity and, in the case of a secondary battery, excellent cycle characteristics. It is thus possible to provide a thin, flexible all solid-state polymer battery that is leak-free and safe and takes advantage of the polymer electrolyte's property of free formability. Therefore, the all solid-state polymer battery can be used as the power source for devices that are required to be thin and reliable, such as personal digital assistants, portable electronic appliances, medical devices, etc.

The invention claimed is:

1. An all solid-state polymer battery comprising a positive electrode, a negative electrode including a negative electrode active material, and a polymer electrolyte,
    wherein the polymer electrolyte includes:
    (1) a solvent component which is at least one ethylene glycol ether selected from the group consisting of methyl monoglyme, methyl diglyme, methyl triglyme, methyl tetraglyme, methyl pentaglyme, ethyl monoglyme, ethyl diglyme, ethyl triglyme, ethyl tetraglyme, ethoxymethoxyethane, and substituted substances thereof having at least one fluorine atom as a substituent;
    (2) a polymer containing electron-donating oxygen atoms in a skeleton; and
    (3) a lithium salt,
    wherein the lithium salt is dissociated to a lithium ion and an anion,
    the molar ratio of the solvent component to the lithium ion is 3 or less, and
    the content of the solvent component in the polymer electrolyte is not more than 25.2% by mass.

2. The all solid-state polymer battery in accordance with claim 1, wherein when the polymer electrolyte is vacuum dried at 20° C. for 24 hours, the mass of the polymer electrolyte decreases at a rate of 3% or less.

3. The all solid-state polymer battery in accordance with claim 1, wherein the molar ratio of the lithium ion to the electron-donating oxygen atoms is from 0.01 to 0.125, and the molar ratio of the ethylene glycol ether to the lithium ion is from 0.05 to 3.

4. The all solid-state polymer battery in accordance with claim 1, wherein the polymer containing the electron-donating oxygen atoms in the skeleton is at least one selected from the group consisting of polyethylene oxide, polypropylene oxide, a copolymer of ethylene oxide and propylene oxide, a polymer containing an ethylene oxide unit or a propylene oxide unit, and polycarbonate.

5. The all solid-state polymer battery in accordance with claim 1, wherein the lithium salt is at least one selected from the group consisting of $LiN(CF_3SO_2)_2$, $LiN(C_2F_5SO_2)_2$, and $LiClO_4$.

6. The all solid-state polymer battery in accordance with claim 1, wherein the ethylene glycol ether is selected from the substituted substances having at least one fluorine atom as a substituent.

7. The all solid-state polymer battery in accordance with claim 1, wherein the negative electrode contains lithium, and an amorphous lithium nitride layer is provided between the negative electrode and the polymer electrolyte.

8. The all solid-state polymer battery in accordance with claim 7, wherein a 1 s spectrum of N in a surface of the lithium nitride layer by XPS analysis has a maximum peak only from 393.5 to 394.5 eV in the binding energy range of 390.0 to 396.0 eV.

9. The all solid-state polymer battery in accordance with claim 1, wherein the negative electrode active material is lithium or a lithium alloy including crystal grains and crystal grain boundaries, at least part of the crystal grain boundaries are exposed on a surface of the lithium or lithium alloy, and the area of an exposed surface of the crystal grain boundaries is 0.02 to 0.5 cm$^2$ per square centimeter of the surface of the lithium or lithium alloy.

10. The all solid-state polymer battery in accordance with claim 9, wherein the crystal grain boundaries include lithium oxide, and the lithium oxide is present in the exposed surface of the crystal grain boundaries.

11. The all solid-state polymer battery in accordance with claim 9, wherein the crystal grain boundaries include lithium oxide, and the lithium oxide is present in the region extending 100 to 1000 nm from the exposed surface of the crystal grain boundaries in the direction perpendicular to the exposed surface.

12. The all solid-state polymer battery in accordance with claim 9, wherein the crystal grains have a grain size of 100 to 1000 nm.

* * * * *